US012626581B2

(12) United States Patent
Lindh et al.

(10) Patent No.: US 12,626,581 B2
(45) Date of Patent: May 12, 2026

(54) SYSTEM AND TECHNIQUE FOR CONTROLLING CLEANING BEHAVIOR AND MANAGING PROHIBITED ACTIONS INTERFERING WITH CLEANLINESS IN A CLEANROOM ENVIRONMENT

(71) Applicant: Ecolab USA Inc., Saint Paul, MN (US)

(72) Inventors: Grant Daniel Lindh, Woodbury, MN (US); Albert Goldfain, Chanhassen, MN (US); Janice Alina Frias, New Brighton, MN (US); Helen Gates, Morecambe (GB); Alex Robert Pederson, Minneapolis, MN (US); Christopher Moen Flynn, Saint Paul, MN (US)

(73) Assignee: Ecolab USA Inc., Saint Paul, MN (US)

( * ) Notice: Subject to any disclaimer, the term of this patent is extended or adjusted under 35 U.S.C. 154(b) by 98 days.

(21) Appl. No.: 18/192,806

(22) Filed: Mar. 30, 2023

(65) Prior Publication Data

US 2023/0316891 A1 Oct. 5, 2023

Related U.S. Application Data

(60) Provisional application No. 63/325,505, filed on Mar. 30, 2022.

(51) Int. Cl.

*G08B 21/24* (2006.01)
*B08B 13/00* (2006.01)

(52) U.S. Cl.

CPC ............ *G08B 21/245* (2013.01); *B08B 13/00* (2013.01)

(58) Field of Classification Search

CPC .............................. G08B 21/245; B08B 13/00

(Continued)

(56) References Cited

U.S. PATENT DOCUMENTS

| | | |
|---|---|---|
| 451,181 A | 4/1891 | Emery |
| 5,966,753 A | 10/1999 | Gauthier et al. |

(Continued)

FOREIGN PATENT DOCUMENTS

| | | |
|---|---|---|
| AU | 2014203541 B2 | 8/2015 |
| AU | 2017101287 A4 | 11/2017 |

(Continued)

OTHER PUBLICATIONS

US 8,773,268 B2, 07/2014, Wildman et al. (withdrawn)

(Continued)

*Primary Examiner* — Brian A Zimmerman
*Assistant Examiner* — Thang D Tran
(74) *Attorney, Agent, or Firm* — Fredrikson & Byron, P.A.

(57) ABSTRACT

This disclosure is directed to a system for detecting when an individual performs a prohibited action during a cleaning event. A wearable computing device that is worn by an individual performing cleaning in an environment detects movement associated with the wearable device during a cleaning event. One or more processors determines, based at least in part on the movement associated with the wearable computing device detected during the cleaning event, whether the individual has performed a prohibited action during the cleaning event. Responsive to determining that the individual performed the prohibited action during the cleaning event, the one or more processors may perform an operation.

38 Claims, 16 Drawing Sheets

(58) Field of Classification Search
USPC ........................................................ 340/573.1
See application file for complete search history.

(56) References Cited

U.S. PATENT DOCUMENTS

| | | | | |
|---|---|---|---|---|
| 5,970,901 | A | 10/1999 | Bruce | |
| 6,236,317 | B1 | 5/2001 | Cohen et al. | |
| 6,426,701 | B1 | 7/2002 | Levy et al. | |
| 6,583,720 | B1 | 6/2003 | Quigley | |
| 6,728,000 | B1 | 4/2004 | Lapstun et al. | |
| 7,170,537 | B2 | 1/2007 | Helma et al. | |
| 7,248,933 | B2 | 7/2007 | Wildman | |
| 7,381,630 | B2 | 6/2008 | Sawyer | |
| 7,423,533 | B1 * | 9/2008 | LeBlond | G08B 21/245 340/572.1 |
| 7,551,092 | B1 | 6/2009 | Henry | |
| 7,701,334 | B1 * | 4/2010 | Perkins | G16H 40/20 340/572.1 |
| 7,872,575 | B2 | 1/2011 | Tabe | |
| 7,926,449 | B2 | 4/2011 | Stellnert et al. | |
| 7,978,083 | B2 | 7/2011 | Melker et al. | |
| 8,021,312 | B2 | 9/2011 | Kinnunen et al. | |
| 8,037,997 | B2 | 10/2011 | Swinderman et al. | |
| 8,094,029 | B2 | 1/2012 | Ortiz et al. | |
| 8,140,143 | B2 | 3/2012 | Picard et al. | |
| 8,146,613 | B2 | 4/2012 | Barnhill et al. | |
| 8,175,840 | B2 | 5/2012 | Hwang et al. | |
| 8,185,231 | B2 | 5/2012 | Fernandez | |
| 8,292,833 | B2 | 10/2012 | Son et al. | |
| 8,294,584 | B2 | 10/2012 | Plost | |
| 8,337,213 | B2 | 12/2012 | Puurunen et al. | |
| 8,395,515 | B2 | 3/2013 | Tokhtuev et al. | |
| 8,463,018 | B2 | 6/2013 | Chung et al. | |
| 8,525,673 | B2 | 9/2013 | Tran | |
| 8,543,241 | B2 | 9/2013 | Hong et al. | |
| 8,702,607 | B2 | 4/2014 | Leboeuf et al. | |
| 8,992,433 | B1 | 3/2015 | Brady et al. | |
| 9,014,983 | B1 | 4/2015 | Uy | |
| 9,024,741 | B2 | 5/2015 | Bennett | |
| 9,095,633 | B1 | 8/2015 | Dayton | |
| 9,135,805 | B2 | 9/2015 | Freedman et al. | |
| 9,147,334 | B2 | 9/2015 | Long et al. | |
| 9,282,893 | B2 | 3/2016 | Longinotti-Buitoni et al. | |
| 9,352,964 | B2 | 5/2016 | Mueller | |
| 9,382,107 | B2 | 7/2016 | Pfeiffer et al. | |
| 9,422,395 | B2 | 8/2016 | Morizur et al. | |
| 9,437,097 | B2 | 9/2016 | Poursohi et al. | |
| 9,437,188 | B1 | 9/2016 | Medina et al. | |
| 9,466,188 | B2 | 10/2016 | Hamam et al. | |
| 9,483,930 | B1 | 11/2016 | Haaland | |
| 9,498,128 | B2 | 11/2016 | Jayalath et al. | |
| 9,542,828 | B1 | 1/2017 | Haaland | |
| 9,637,309 | B2 | 5/2017 | Starkey et al. | |
| 9,693,730 | B2 | 7/2017 | Workman et al. | |
| 9,712,893 | B2 | 7/2017 | Warkentin et al. | |
| 9,727,182 | B2 | 8/2017 | Deokar et al. | |
| 9,836,950 | B2 | 12/2017 | Levchenko et al. | |
| 9,842,563 | B2 | 12/2017 | Russell | |
| 9,847,013 | B2 | 12/2017 | Song et al. | |
| 9,864,955 | B2 | 1/2018 | Faaborg et al. | |
| 9,870,056 | B1 | 1/2018 | Yao | |
| 9,911,312 | B2 | 3/2018 | Wildman et al. | |
| 9,922,533 | B2 | 3/2018 | Hayes et al. | |
| 9,959,743 | B2 | 5/2018 | Morgan et al. | |
| 9,961,189 | B2 | 5/2018 | Kadous | |
| 9,977,509 | B2 | 5/2018 | Park et al. | |
| 9,993,197 | B2 | 6/2018 | Proud | |
| 10,004,823 | B2 | 6/2018 | Reid et al. | |
| 10,017,622 | B2 | 7/2018 | Flores et al. | |
| 10,064,711 | B1 | 9/2018 | Richter et al. | |
| 10,066,056 | B2 | 9/2018 | Flores et al. | |
| 10,144,013 | B2 | 12/2018 | Fritchie | |
| 10,159,432 | B1 | 12/2018 | Pathak et al. | |
| 10,159,623 | B2 | 12/2018 | Leftly | |
| 10,219,975 | B2 | 3/2019 | Horrocks et al. | |
| 10,222,278 | B2 | 3/2019 | Weston et al. | |
| 10,223,894 | B2 | 3/2019 | Raichman | |
| 10,235,861 | B1 | 3/2019 | Burns et al. | |
| 10,241,514 | B2 | 3/2019 | Passot et al. | |
| 10,290,198 | B2 | 5/2019 | Kay | |
| 10,296,719 | B2 | 5/2019 | Ekin | |
| 10,332,382 | B2 | 6/2019 | Thyroff | |
| 10,349,733 | B2 | 7/2019 | Serval et al. | |
| 10,368,810 | B2 | 8/2019 | Quinn et al. | |
| 10,376,423 | B2 | 8/2019 | Staton et al. | |
| 10,393,884 | B2 | 8/2019 | Larbi | |
| 10,398,278 | B2 | 9/2019 | Han | |
| 10,398,359 | B2 | 9/2019 | Dumanyan et al. | |
| 10,426,254 | B2 | 10/2019 | Hardeman et al. | |
| 10,456,489 | B2 | 10/2019 | Dayton | |
| 10,490,057 | B1 | 11/2019 | Malina et al. | |
| 10,500,716 | B2 | 12/2019 | Wei et al. | |
| 10,503,943 | B2 | 12/2019 | Alwesh et al. | |
| 10,511,950 | B2 | 12/2019 | Maier et al. | |
| 10,529,219 | B2 | 1/2020 | Herdt et al. | |
| 10,535,362 | B2 | 1/2020 | Bryan et al. | |
| 10,556,034 | B2 | 2/2020 | Jin et al. | |
| 10,560,811 | B2 | 2/2020 | Chen | |
| 10,576,930 | B2 | 3/2020 | Hill et al. | |
| 10,593,188 | B2 | 3/2020 | Shoari | |
| 10,598,649 | B2 | 3/2020 | Talamo et al. | |
| 10,607,471 | B2 | 3/2020 | Hood et al. | |
| 10,625,005 | B2 | 4/2020 | Chang et al. | |
| 10,646,029 | B2 | 5/2020 | Serval et al. | |
| 10,653,774 | B2 | 5/2020 | Dubensky, Jr. et al. | |
| 10,667,683 | B2 | 6/2020 | Jackson et al. | |
| 10,671,164 | B2 | 6/2020 | Laszlo et al. | |
| 10,674,060 | B2 | 6/2020 | Yuan | |
| 10,692,355 | B2 * | 6/2020 | Waghode | G16H 40/20 |
| 10,713,925 | B2 | 7/2020 | Bolling et al. | |
| 10,714,216 | B1 * | 7/2020 | Hardman | G01S 5/02 |
| 10,716,481 | B2 | 7/2020 | Leboeuf et al. | |
| 10,732,825 | B2 | 8/2020 | Campbell et al. | |
| 10,737,300 | B2 | 8/2020 | Mcgillicuddy et al. | |
| 10,748,410 | B2 | 8/2020 | Liu et al. | |
| 10,786,163 | B2 | 9/2020 | Chang et al. | |
| 10,788,836 | B2 | 9/2020 | Ebrahimi Afrouzi et al. | |
| 10,835,028 | B2 | 11/2020 | Gatzemeyer et al. | |
| 10,856,813 | B2 | 12/2020 | Leboeuf et al. | |
| 10,880,266 | B1 | 12/2020 | Shribman et al. | |
| 10,885,768 | B2 | 1/2021 | Longhenry et al. | |
| 10,890,921 | B2 | 1/2021 | Gillett | |
| 10,930,134 | B2 | 2/2021 | Zhang et al. | |
| 10,952,666 | B2 | 3/2021 | Schmidt et al. | |
| 10,993,598 | B2 | 5/2021 | Park et al. | |
| 11,006,742 | B2 | 5/2021 | Jeanne et al. | |
| 11,017,655 | B2 | 5/2021 | Harman et al. | |
| 11,019,972 | B2 | 6/2021 | Lee et al. | |
| 11,051,919 | B2 | 7/2021 | Serval et al. | |
| 11,097,096 | B2 | 8/2021 | Linden et al. | |
| 11,106,210 | B2 | 8/2021 | Liu et al. | |
| 11,106,273 | B2 | 8/2021 | Hazra et al. | |
| 11,187,225 | B2 | 11/2021 | Mou et al. | |
| 11,278,384 | B2 | 3/2022 | Serval et al. | |
| 11,288,945 | B2 | 3/2022 | Kolavennu et al. | |
| 11,308,788 | B2 | 4/2022 | Hayes et al. | |
| 11,355,227 | B2 | 6/2022 | Karunanithi et al. | |
| 11,361,672 | B2 | 6/2022 | Gatzemeyer | |
| 11,367,516 | B2 | 6/2022 | Vleugels | |
| 11,402,850 | B2 | 8/2022 | Gagne et al. | |
| 11,426,264 | B2 | 8/2022 | Serval et al. | |
| 11,430,321 | B2 | 8/2022 | Goldfain et al. | |
| 11,510,064 | B2 | 11/2022 | Liang et al. | |
| 11,521,183 | B2 | 12/2022 | Barry et al. | |
| 11,556,844 | B2 | 1/2023 | Chae et al. | |
| 11,615,694 | B2 * | 3/2023 | Kelly | G08B 21/245 340/540 |
| 11,632,258 | B1 * | 4/2023 | Libin | G06F 3/165 709/204 |
| 11,639,944 | B2 | 5/2023 | Laput et al. | |
| 11,771,213 | B2 | 10/2023 | Deane et al. | |
| 11,804,124 | B2 | 10/2023 | Goldfain et al. | |
| 11,857,691 | B2 | 1/2024 | Hussein et al. | |
| 11,890,092 | B2 | 2/2024 | Azevedo et al. | |

(56) References Cited

U.S. PATENT DOCUMENTS

2005/0034420 A1 2/2005 Radlinger et al.
2005/0154325 A1 7/2005 Lauter et al.
2006/0071799 A1 4/2006 Verdiramo
2006/0238503 A1 10/2006 Smith et al.
2006/0272361 A1 12/2006 Snodgrass
2007/0168125 A1 7/2007 Petrik
2007/0197261 A1 8/2007 Humbel
2008/0119957 A1* 5/2008 Ellis ........................ G06Q 10/08 209/583
2008/0163344 A1 7/2008 Yang
2009/0092955 A1 4/2009 Hwang
2009/0195385 A1* 8/2009 Huang ................... G16H 40/20 340/572.1
2009/0224907 A1* 9/2009 Sinha ................... G08B 21/245 340/541
2009/0224924 A1* 9/2009 Thorp .................... G16H 40/20 340/573.1
2009/0267776 A1* 10/2009 Glenn .................... G16H 40/20 340/573.1
2010/0073162 A1 3/2010 Johnson et al.
2010/0274191 A1 10/2010 Ting
2010/0328443 A1 12/2010 Lynam et al.
2011/0043362 A1 2/2011 Reibel
2011/0084835 A1* 4/2011 Whitehouse ........... A61B 1/121 340/540
2011/0108087 A1 5/2011 Tarbell et al.
2011/0110560 A1 5/2011 Adhikari
2011/0148586 A1* 6/2011 Anderson .............. G16H 40/20 340/10.1
2011/0193703 A1 8/2011 Payton et al.
2011/0316695 A1* 12/2011 Li ........................ G08B 21/245 340/539.13
2012/0040881 A1* 2/2012 Eiting ...................... C11D 3/28 544/212
2012/0073604 A1 3/2012 Barnhill et al.
2012/0116803 A1 5/2012 Reid et al.
2012/0119984 A1 5/2012 Sankarasubramaniam et al.
2013/0000670 A1 1/2013 Binner et al.
2013/0024065 A1 1/2013 Chiu et al.
2013/0201316 A1 8/2013 Binder et al.
2013/0268293 A1* 10/2013 Knudson ................ G16H 40/60 705/2
2013/0326790 A1 12/2013 Cauwels et al.
2013/0332184 A1 12/2013 Burnham et al.
2014/0207280 A1* 7/2014 Duffley ................ G05D 1/0016 700/257
2014/0207721 A1 7/2014 Filson et al.
2014/0266732 A1 9/2014 Barbeau et al.
2014/0278514 A1 9/2014 Stromberg
2014/0309763 A1 10/2014 Messenger
2015/0068069 A1 3/2015 Tran et al.
2015/0109442 A1* 4/2015 Derenne ................ H04N 7/185 348/143
2015/0127365 A1 5/2015 Rizvi et al.
2015/0134357 A1 5/2015 Davis et al.
2015/0220867 A1* 8/2015 Christensen ............ E05F 15/74 705/7.39
2015/0261519 A1 9/2015 Hsieh et al.
2015/0316993 A1 11/2015 Minnen
2015/0338916 A1 11/2015 Priyantha et al.
2016/0045654 A1 2/2016 Connor
2016/0125348 A1 5/2016 Dyer et al.
2016/0140317 A1 5/2016 Tegreene et al.
2016/0148485 A1 5/2016 Hayes et al.
2016/0275779 A1* 9/2016 Hajdenberg ........... G08B 25/08
2016/0324487 A1 11/2016 Guo et al.
2016/0325480 A1 11/2016 Soletti et al.
2016/0328948 A1 11/2016 Ferniany
2016/0367188 A1 12/2016 Malik et al.
2016/0371960 A1 12/2016 Haaland
2017/0003149 A1 1/2017 Berk et al.
2017/0015584 A1 1/2017 Krzyzak et al.
2017/0046943 A1 2/2017 Haaland
2017/0076042 A1 3/2017 Katz et al.
2017/0098366 A1* 4/2017 Hood ..................... G16H 40/20
2017/0124850 A1 5/2017 Kramer
2017/0184971 A1 6/2017 Johnson
2017/0188851 A1 7/2017 Leboeuf et al.
2017/0192513 A1 7/2017 Karmon et al.
2017/0227530 A1 8/2017 Finison et al.
2017/0270258 A1* 9/2017 Duckert ................. G16H 40/40
2018/0028038 A1 2/2018 Setchell et al.
2018/0059813 A1 3/2018 Li et al.
2018/0120794 A1 5/2018 Cheng et al.
2018/0125623 A1 5/2018 Serval et al.
2018/0181094 A1 6/2018 Funk et al.
2018/0253954 A1 9/2018 Verma
2018/0254096 A1 9/2018 Karunanithi et al.
2018/0268735 A1 9/2018 Jihn
2018/0330306 A1 11/2018 Shaw et al.
2018/0357886 A1 12/2018 Tavori et al.
2018/0373877 A1* 12/2018 Bruso ................... G06F 21/552
2019/0008270 A1 1/2019 Hardeman et al.
2019/0012898 A1* 1/2019 Wittrup ................ G08B 21/245
2019/0013101 A1 1/2019 Johnson et al.
2019/0043337 A1* 2/2019 Liu ........................ G16H 40/20
2019/0051138 A1 2/2019 Easter
2019/0122767 A1 4/2019 Slepian
2019/0143176 A1 5/2019 Wilson
2019/0160231 A1 5/2019 Dobie et al.
2019/0175104 A1 6/2019 Malik
2019/0199071 A1 6/2019 Shachar et al.
2019/0204909 A1 7/2019 Xiao
2019/0209022 A1 7/2019 Reed et al.
2019/0213060 A1 7/2019 Raymann et al.
2019/0223770 A1 7/2019 Malik
2019/0231267 A1 8/2019 Oren et al.
2019/0236465 A1 8/2019 Vleugels
2019/0236935 A1 8/2019 Pfenniger et al.
2019/0251832 A1 8/2019 Longhenry et al.
2019/0282718 A1 9/2019 Cole
2019/0290181 A1 9/2019 Mrvaljevic et al.
2019/0290297 A1 9/2019 Haider et al.
2019/0336080 A1 11/2019 Leboeuf et al.
2019/0358428 A1 11/2019 Wang
2019/0369641 A1 12/2019 Gillett
2019/0380597 A1 12/2019 Howard
2019/0384968 A1 12/2019 Brown et al.
2020/0008749 A1 1/2020 Golda et al.
2020/0022581 A1 1/2020 Vanegas et al.
2020/0027336 A1 1/2020 Cho et al.
2020/0035084 A1 1/2020 Hermann et al.
2020/0039908 A1 2/2020 Elsohly et al.
2020/0064456 A1 2/2020 Xu et al.
2020/0101352 A1 4/2020 Liu et al.
2020/0103894 A1 4/2020 Cella et al.
2020/0107781 A1 4/2020 Navalgund et al.
2020/0146275 A1* 5/2020 Olson ................. A01M 25/004
2020/0236509 A1 7/2020 Theurer et al.
2020/0250955 A1 8/2020 Goldfain et al.
2020/0250956 A1* 8/2020 Hayes .................... G16H 40/20
2020/0302775 A1* 9/2020 Liu .................... G06K 7/10366
2020/0305674 A1 10/2020 Setchell et al.
2020/0347674 A1* 11/2020 Haynes ..................... E06C 7/42
2020/0349575 A1* 11/2020 Karmakar ............... G06F 17/15
2020/0377020 A1 12/2020 Ramgopal et al.
2020/0380849 A1* 12/2020 Zhang ...................... G08B 7/06
2021/0007569 A1 1/2021 Howard et al.
2021/0012254 A1* 1/2021 Campbell .......... G06Q 30/0185
2021/0022536 A1 1/2021 Anderson et al.
2021/0022659 A1 1/2021 Fafiani et al.
2021/0026366 A1 1/2021 Horesh
2021/0027402 A1 1/2021 Davis et al.
2021/0049894 A1 2/2021 Bolling et al.
2021/0057101 A1 2/2021 Desa et al.
2021/0081054 A1 3/2021 Yang et al.
2021/0081055 A1 3/2021 Sinha et al.
2021/0089040 A1 3/2021 Ebrahimi Afrouzi et al.
2021/0110698 A1 4/2021 Hermann et al.
2021/0110734 A1 4/2021 May
2021/0117932 A1 4/2021 Barry et al.
2021/0142692 A1 5/2021 Hong et al.
2021/0150880 A1 5/2021 Xing et al.

(56) References Cited

U.S. PATENT DOCUMENTS

| | | | | |
|---|---|---|---|---|
| 2021/0155507 | A1* | 5/2021 | Kamen | B65B 31/02 |
| 2021/0166550 | A1 | 6/2021 | Bolling et al. | |
| 2021/0322853 | A1 | 10/2021 | Lockhart et al. | |
| 2021/0324659 | A1* | 10/2021 | McGowan, Jr. | A61L 2/24 |
| 2021/0350689 | A1* | 11/2021 | Kelly | G08B 21/245 |
| 2022/0001236 | A1 | 1/2022 | Mooney | |
| 2022/0008243 | A1 | 1/2022 | Osorio Martini et al. | |
| 2022/0026214 | A1 | 1/2022 | Cook et al. | |
| 2022/0083948 | A1* | 3/2022 | Robertson | G06Q 10/0635 |
| 2022/0083958 | A1* | 3/2022 | Shelton | E05G 1/08 |
| 2022/0114500 | A1* | 4/2022 | Nayshtut | G06F 21/64 |
| 2022/0248980 | A1 | 8/2022 | Devani | |
| 2022/0293278 | A1* | 9/2022 | Correnti | G06V 40/172 |
| 2022/0355122 | A1 | 11/2022 | Strommer et al. | |
| 2023/0014548 | A1 | 1/2023 | Podvent et al. | |
| 2023/0237850 | A1* | 7/2023 | Figueiredo | G06F 18/24133 340/573.1 |
| 2023/0238150 | A1* | 7/2023 | Toth | G16H 40/67 705/2 |

FOREIGN PATENT DOCUMENTS

| | | | |
|---|---|---|---|
| CA | 1156423 | A | 11/1983 |
| CA | 2318206 | A1 | 7/1999 |
| CA | 2607915 | A1 | 4/2009 |
| CA | 2610324 | A1 | 6/2009 |
| CA | 2852637 | C | 8/2019 |
| CH | 716795 | A2 | 5/2021 |
| CN | 1576740 | A | 2/2005 |
| CN | 102099119 | A | 6/2011 |
| CN | 102138709 | A | 8/2011 |
| CN | 102233346 | A | 11/2011 |
| CN | 102307618 | A | 1/2012 |
| CN | 101955130 | B | 3/2012 |
| CN | 102439972 | A | 5/2012 |
| CN | 102441220 | A | 5/2012 |
| CN | 102756805 | A | 10/2012 |
| CN | 102798734 | A | 11/2012 |
| CN | 103006164 | A | 4/2013 |
| CN | 103006234 | A | 4/2013 |
| CN | 103425895 | A | 12/2013 |
| CN | 103429106 | A | 12/2013 |
| CN | 103792944 | A | 5/2014 |
| CN | 104052857 | A | 9/2014 |
| CN | 203902502 | U | 10/2014 |
| CN | 104139180 | A | 11/2014 |
| CN | 104306018 | A | 1/2015 |
| CN | 104346973 | A | 2/2015 |
| CN | 104501840 | A | 4/2015 |
| CN | 104731103 | A | 6/2015 |
| CN | 204562440 | U | 8/2015 |
| CN | 204631547 | U | 9/2015 |
| CN | 104994601 | A | 10/2015 |
| CN | 105021846 | A | 11/2015 |
| CN | 105068540 | A | 11/2015 |
| CN | 105117958 | A | 12/2015 |
| CN | 105189651 | A | 12/2015 |
| CN | 105274775 | A | 1/2016 |
| CN | 204990347 | U | 1/2016 |
| CN | 105352545 | A | 2/2016 |
| CN | 105427008 | A | 3/2016 |
| CN | 105442244 | A | 3/2016 |
| CN | 105528519 | A | 4/2016 |
| CN | 105573333 | A | 5/2016 |
| CN | 105615763 | A | 6/2016 |
| CN | 105776455 | A | 7/2016 |
| CN | 105792720 | A | 7/2016 |
| CN | 105794223 | A | 7/2016 |
| CN | 105796087 | A | 7/2016 |
| CN | 105799831 | A | 7/2016 |
| CN | 105869449 | A | 8/2016 |
| CN | 105919584 | A | 9/2016 |
| CN | 105955039 | A | 9/2016 |
| CN | 105996989 | A | 10/2016 |
| CN | 106223160 | A | 12/2016 |
| CN | 106352404 | A | 1/2017 |
| CN | 106499837 | A | 3/2017 |
| CN | 206044628 | U | 3/2017 |
| CN | 106779947 | A | 5/2017 |
| CN | 106794107 | A | 5/2017 |
| CN | 206152172 | U | 5/2017 |
| CN | 106843242 | A | 6/2017 |
| CN | 106859596 | A | 6/2017 |
| CN | 206271345 | U | 6/2017 |
| CN | 106953266 | A | 7/2017 |
| CN | 106988191 | A | 7/2017 |
| CN | 206303119 | U | 7/2017 |
| CN | 107004242 | A | 8/2017 |
| CN | 107004756 | A | 8/2017 |
| CN | 107034679 | A | 8/2017 |
| CN | 107111602 | A | 8/2017 |
| CN | 206475184 | U | 9/2017 |
| CN | 107224249 | A | 10/2017 |
| CN | 107361986 | A | 11/2017 |
| CN | 107403210 | A | 11/2017 |
| CN | 107416073 | A | 12/2017 |
| CN | 107624653 | A | 1/2018 |
| CN | 107638177 | A | 1/2018 |
| CN | 206917345 | U | 1/2018 |
| CN | 107648800 | A | 2/2018 |
| CN | 107902081 | A | 4/2018 |
| CN | 107978129 | A | 5/2018 |
| CN | 107993290 | A | 5/2018 |
| CN | 108022459 | A | 5/2018 |
| CN | 108057239 | A | 5/2018 |
| CN | 108082424 | A | 5/2018 |
| CN | 108089464 | A | 5/2018 |
| CN | 108090967 | A | 5/2018 |
| CN | 207304728 | U | 5/2018 |
| CN | 108107904 | A | 6/2018 |
| CN | 207496930 | U | 6/2018 |
| CN | 108260543 | A | 7/2018 |
| CN | 108318506 | A | 7/2018 |
| CN | 108530806 | A | 9/2018 |
| CN | 108593870 | A | 9/2018 |
| CN | 108594906 | A | 9/2018 |
| CN | 108602188 | A | 9/2018 |
| CN | 207803091 | U | 9/2018 |
| CN | 207809733 | U | 9/2018 |
| CN | 207862018 | U | 9/2018 |
| CN | 108879480 | A | 11/2018 |
| CN | 108956444 | A | 12/2018 |
| CN | 108960337 | A | 12/2018 |
| CN | 108992862 | A | 12/2018 |
| CN | 109044181 | A | 12/2018 |
| CN | 109077713 | A | 12/2018 |
| CN | 109079781 | A | 12/2018 |
| CN | 208211995 | U | 12/2018 |
| CN | 109112799 | A | 1/2019 |
| CN | 109292734 | A | 2/2019 |
| CN | 109325894 | A | 2/2019 |
| CN | 109347924 | A | 2/2019 |
| CN | 109431460 | A | 3/2019 |
| CN | 109475242 | A | 3/2019 |
| CN | 109513590 | A | 3/2019 |
| CN | 109520648 | A | 3/2019 |
| CN | 109654945 | A | 4/2019 |
| CN | 109875518 | A | 6/2019 |
| CN | 109875543 | A | 6/2019 |
| CN | 110215165 | A | 9/2019 |
| CN | 209433203 | U | 9/2019 |
| CN | 110297080 | A | 10/2019 |
| CN | 110341907 | A | 10/2019 |
| CN | 209695449 | U | 11/2019 |
| CN | 110585649 | A | 12/2019 |
| CN | 110841262 | A | 2/2020 |
| CN | 210104838 | U | 2/2020 |
| CN | 110926444 | A | 3/2020 |
| CN | 110955212 | A | 4/2020 |
| CN | 111067390 | A | 4/2020 |
| CN | 111089587 | A | 5/2020 |
| CN | 111135448 | A | 5/2020 |
| CN | 111135449 | A | 5/2020 |

(56) References Cited

FOREIGN PATENT DOCUMENTS

| | | | |
|---|---|---|---|
| CN | 111141284 | A | 5/2020 |
| CN | 210494881 | U | 5/2020 |
| CN | 111351848 | A | 6/2020 |
| CN | 210761053 | U | 6/2020 |
| CN | 210873733 | U | 6/2020 |
| CN | 111420938 | A | 7/2020 |
| CN | 111524333 | A | 8/2020 |
| CN | 111529986 | A | 8/2020 |
| CN | 111587809 | A | 8/2020 |
| CN | 111603750 | A | 9/2020 |
| CN | 111665902 | A | 9/2020 |
| CN | 111744156 | A | 10/2020 |
| CN | 111782643 | A | 10/2020 |
| CN | 211787465 | U | 10/2020 |
| CN | 112086159 | A | 12/2020 |
| CN | 112284387 | A | 1/2021 |
| CN | 112419799 | A | 2/2021 |
| CN | 112488483 | A | 3/2021 |
| CN | 112572797 | A | 3/2021 |
| CN | 112687086 | A | 4/2021 |
| CN | 112766041 | A | 5/2021 |
| CN | 112770695 | A | 5/2021 |
| CN | 112773283 | A | 5/2021 |
| CN | 112817446 | A | 5/2021 |
| CN | 112865279 | A | 5/2021 |
| CN | 112870525 | A | 6/2021 |
| DE | 10127156 | A1 | 12/2002 |
| DE | 102008020914 | A1 | 5/2009 |
| DE | 102008049380 | A1 | 4/2010 |
| DE | 102012223149 | A1 | 6/2014 |
| DE | 102015002305 | A1 | 8/2016 |
| DE | 202017002295 | U1 | 8/2017 |
| EP | 97742 | A1 | 1/1984 |
| EP | 1119210 | A1 | 7/2001 |
| EP | 2404193 | B1 | 5/2017 |
| EP | 3441758 | A1 | 2/2019 |
| EP | 3822984 | A1 | 5/2021 |
| ES | 1194609 | U | 10/2017 |
| FR | 2863807 | A1 | 6/2005 |
| GB | 2324397 | A | 10/1998 |
| GB | 2417811 | B | 10/2007 |
| GB | 2476908 | B | 12/2012 |
| GB | 2505981 | A | 3/2014 |
| GB | 2542884 | A | 4/2017 |
| GB | 2576479 | A | 2/2020 |
| GB | 2579256 | A | 6/2020 |
| JP | 2000037588 | A | 2/2000 |
| JP | 2009010979 | A | 1/2009 |
| JP | 2011109563 | A | 6/2011 |
| JP | 2012185695 | A | 9/2012 |
| JP | 2015006650 | A | 1/2015 |
| JP | 2015167470 | A | 9/2015 |
| JP | 2018117981 | A | 8/2018 |
| JP | 2020064580 | A | 4/2020 |
| KR | 1020040103674 | A | 12/2004 |
| KR | 100603620 | B1 | 7/2006 |
| KR | 1020110085437 | A | 7/2011 |
| KR | 1020150080094 | A | 7/2015 |
| KR | 1020160022445 | A | 3/2016 |
| KR | 1709715 | B1 | 2/2017 |
| KR | 1768113 | B1 | 8/2017 |
| KR | 1020170114833 | A | 10/2017 |
| KR | 1020180065241 | A | 6/2018 |
| KR | 1875831 | B1 | 7/2018 |
| KR | 1878710 | B1 | 7/2018 |
| KR | 1020180077551 | A | 7/2018 |
| KR | 1938421 | B1 | 1/2019 |
| KR | 1020190004406 | A | 1/2019 |
| KR | 1020200145342 | A | 12/2020 |
| RU | 2463156 | C9 | 10/2012 |
| TW | 201040890 | A | 11/2010 |
| TW | 201231938 | A | 8/2012 |
| TW | M552575 | U | 12/2017 |
| WO | 0134883 | A2 | 5/2001 |
| WO | 2005089293 | A2 | 9/2005 |
| WO | 2006092813 | A1 | 9/2006 |
| WO | 2007075701 | A2 | 7/2007 |
| WO | 2009146525 | A1 | 12/2009 |
| WO | 2011009725 | A1 | 1/2011 |
| WO | 2012092524 | A2 | 7/2012 |
| WO | 2012140152 | A1 | 10/2012 |
| WO | 2013068955 | A1 | 5/2013 |
| WO | 2013190016 | A1 | 12/2013 |
| WO | 2014144940 | A2 | 9/2014 |
| WO | 2015029060 | A2 | 3/2015 |
| WO | 2015055971 | A1 | 4/2015 |
| WO | 2015084031 | A1 | 6/2015 |
| WO | 2016189358 | A1 | 12/2016 |
| WO | 2017015767 | A1 | 2/2017 |
| WO | 2017074713 | A1 | 5/2017 |
| WO | 2017088068 | A1 | 6/2017 |
| WO | 2017094016 | A1 | 6/2017 |
| WO | 2017098505 | A1 | 6/2017 |
| WO | 2017198337 | A1 | 11/2017 |
| WO | 2018118926 | A1 | 6/2018 |
| WO | 2018122600 | A2 | 7/2018 |
| WO | 2018142107 | A1 | 8/2018 |
| WO | 2018152365 | A1 | 8/2018 |
| WO | 2019025872 | A2 | 2/2019 |
| WO | 2019055405 | A1 | 3/2019 |
| WO | 2019215447 | A1 | 11/2019 |
| WO | 2020023998 | A1 | 2/2020 |
| WO | 2020033550 | A1 | 2/2020 |
| WO | 2020243823 | A2 | 12/2020 |

OTHER PUBLICATIONS

US 10,413,477 B2, 09/2019, Petty et al. (withdrawn)

US 10,470,972, 09/2019, Petty et al. (withdrawn)

Hwang et al., "Wristband-type wearable health devices to measure construction workers' physical demands," Automation in Construction, vol. 83, Nov. 2017, pp. 330-340, Abstract only.

Liu et al., "Significant Change Spotting for Periodic Human Motion Segmentation of Cleaning Tasks Using Wearable Sensors," Sensors (Basel), vol. 17, No. 1, Jan. 2017, 19 pages.

Peixoto et al., "Designing the Smart Badge: A Wearable Device for Hospital Workers," PervasiveHealth 18, 2018, 4 pages.

Pereira et al., "Physical Activity Intensity Monitoring of Hospital Workers using a Wearable Sensor," PervasiveHealth 18, 2018, 4 pages.

Garcia-Armisen et al., "CRP (Contamination Risk prevention) Using machine learning & Artificial Intelligence to predict microbial risk in clean room enviroments", 2021 PDA Pharmaceutical Microbiology Conference, Oct. 4, 2021, pp. 1-30.

International Searching Authority, "Search Report and Written Opinion" , from Application No. PCT/US2023/016806, mailed Jun. 9, 2023, pp. 1-23.

* cited by examiner

SYSTEM AND TECHNIQUE FOR CONTROLLING CLEANING BEHAVIOR AND MANAGING PROHIBITED ACTIONS INTERFERING WITH CLEANLINESS IN A CLEANROOM ENVIRONMENT

RELATED APPLICATIONS

This application claims the benefit of U.S. Provisional Patent Application No. 63/325,505, filed Mar. 30, 2022, the entire contents of which are incorporated herein by reference.

TECHNICAL FIELD

This disclosure relates to devices and techniques for managing cleanliness, including monitoring and controlling of cleaning behavior through a wearable computing device and detecting prohibited actions interfering with cleanliness, particularly in a cleanroom environment.

BACKGROUND

A cleanroom is an engineered space, which maintains a very low concentration of airborne particulates. Cleanrooms are well isolated, well-controlled from contamination, and actively cleansed. Such rooms are commonly needed for scientific research and industrial production, such as for semiconductor manufacturing, pharmaceutical manufacturing, and other highly pure applications. A cleanroom is designed to keep contaminants such as dust, airborne organisms, and vaporized particles outside of the cleanroom environment and away from whatever product is being handled inside the cleanroom.

Conversely, a cleanroom can also help keep materials escaping from the cleanroom. For instance, in hazardous biology, nuclear work, pharmaceutics, and virology, cleanroom systems may be utilized to keep hazardous materials contained within the cleanroom.

Cleanrooms typically come with a cleanliness level quantified by the number of particles per cubic meter at a predetermined molecule measure. The ambient outdoor air in a typical urban area contains 35,000,000 particles for each cubic meter in the size range 0.5 μm and bigger. By comparison an ISO 14644-1 level 1 certified cleanroom permits no particles in that size range, and just 12 particles for each cubic meter of 0.3 μm and smaller.

SUMMARY

In general, this disclosure is directed to devices, systems, and techniques for managing hygiene activity by deploying a computing device associated with an individual performing cleaning to track the efficacy of their cleaning actions and detect whether any prohibited actions were performed. The computing device can include one or more sensors that detect and measure cleaning motion associated movement of the computing device caused by movement of the individual, e.g., during a cleaning event. In some examples, the computing device is worn by the individual performing the cleaning, such as at a location between their shoulder and tip of their fingers (e.g., wrist, upper arm). In either case, the computing device can detect movement associated with the individual going about their assigned tasks, which may include movement during cleaning activities as well as interstitial movements between cleaning activities. The movement data generated by the computing device can be analyzed to determine whether the individual performed a prohibited action during the cleaning event. In some configurations, an operation of the computing device is controlled based on the determination of the prohibited action performance. Additionally or alternatively, the efficacy of the cleaning determined can be stored for the cleaning event, providing cleaning validation information for the environment being cleaned.

While the devices, systems, and techniques of the disclosure can be implemented in a variety of different environments, in some examples, the technology is utilized in a cleanroom. In general, a cleanroom is an enclosed space that defines a controlled environment where pollutants such as dust, airborne microbes, and aerosol particles are filtered out in order to provide the cleanest area possible. Cleanrooms are typically used for manufacturing products such as electronics, pharmaceutical products, and medical equipment. A cleanroom can be classified into different levels of contamination depending on the amount of particles allowed in the space, per cubic meter. For example, the International Organization for Standardization (ISO) classifies cleanrooms under ISO 14644 with classes ranging from 1 to 9 (class 1, 2, 3, 4, 5, 6, 7, 8, and 9) depending on the number and size of particles permitted in the per volume of air in the cleanroom. Cleanrooms may also control variables like temperature, air flow, and humidity.

In practice, the cleanroom and/or equipment in the cleanroom may need to be periodically cleaned to maintain the cleanliness of the room and/or equipment in the room. To do this, one or more individuals may enter the room to perform cleaning. The individual performing cleaning may first put on garments required to enter the cleanroom (e.g., gown, gloves, face mask, booties) before passing through an airlock to enter the cleanroom. The individual may be assigned one more cleaning tasks (e.g., surfaces and/or objects to be cleaned) while inside the cleanroom. While performing those assigned cleaning tasks, the individual may be instructed to avoid certain actions that undermine the cleanliness of the cleanroom. For example, the individual may be instructed not to walk too fast in the clean room or not to make certain motions, which can cause particulate to slough off and contaminate the air. As another example, the individual may be instructed to avoid leaning against or touching certain surfaces, which cause contamination of the surfaces.

The devices, systems, and techniques of the disclosure may utilize a wearable computing device to track motion of an individual within a cleanroom, optionally while also monitoring behavior of the individual through one or more visual sensors. Data generated while monitoring the individual(s) designated to perform cleaning may determine if the individual(s) have appropriately performed the assigned cleaning activities and/or performed any prohibited actions during cleaning that may raise a cleaning compliance concern. By activity tracking the behavior of individual(s) performing cleaning in the cleanroom, the efficacy of the cleaning process can be monitored and validated. If a cleaning violation is detected, such as an individual not performing a requisite cleaning action or an individual performing a prohibited action, corrective action can be taken. For example, remedial cleaning can be performed in the cleanroom, airflows may be adjusted in the cleanroom or the cleanroom taken out of service for a period of time, the individual performing the cleaning violation may receive additional training, etc.

The types of hygiene activities monitored during a cleaning event may vary depending on the hygiene practices established for the environment being cleaned. As one example, the individual performing cleaning may be assigned a certain number of target surfaces to be cleaned. For example, in the case of a cleanroom environment, the surfaces to be cleaned may include floors, walls, tables, carts, monitors, laboratory equipment, manufacturing equipment, and any other equipment or surfaces typically found in a cleanroom environment. In any case, the individual performing cleaning may be assigned a number of surfaces to be cleaned.

During operation, the computing device can generate a signal corresponding to movement of the device caused by the individual performing cleaning carrying out their tasks or moving between tasks. Each surface targeted for cleaning may have a different movement signal associated with cleaning of that target surface or movement throughout the environment. Movement data generated by the computing device can be compared with reference movement data associated with each target surface. If the movement data indicates that the individual performing cleaning has performed a prohibited action, the computing device may perform an operation. For example, the computing device may provide an alert in substantially real time indicating the prohibited action that was performed.

Additionally or alternatively, the quality of cleaning of any particular target surface may also be determined using movement data generated by the computing device during the cleaning operation. For example, the movement data generated by the computing device during cleaning of a particular surface can be compared with reference movement data associated with a quality of cleaning of that target surface. The reference movement data associated with the quality of cleaning may correspond to a thoroughness with which the target surface is cleaned and/or an extent or area of the target surface.

In some applications, the individual carrying the computing device may be tasked with performing cleaning and non-cleaning tasks and/or performing multiple different cleaning tasks. The computing device can generate a signal corresponding to movement during this entire course of activity. Movement data generated by the computing device can be compared with reference movement data to classify and distinguish between cleaning and non-cleaning actions. The movement data identified as corresponding to a cleaning action can further by analyzed to determine the specific type of cleaning action performed (e.g., surface cleaning as opposed to other types of cleaning). In some examples, the computing device can generate a risk score for any individual activity or combination of activities performed by an individual or a group of individuals. Even if a particular activity is not prohibited, for certain environments, including cleanroom environments, a series of movements or actions that are not completely prohibited but still not the recommended action can result in the environment not being properly sterilized. As such, by calculating a risk score, it may be determined that improper cleaning was performed even though a specifically prohibited action was not performed.

In one example, the disclosure is directed to a method that includes detecting, by a wearable computing device that is worn by an individual performing cleaning in an environment, movement associated with the wearable device during a cleaning event. The method further includes determining, by one or more processors, based on the movement associated with the wearable computing device detected during the cleaning event, whether the individual has performed a prohibited action during the cleaning event. The method also includes, responsive to determining that the individual performed the prohibited action during the cleaning event, performing, by the one or more processors, an operation.

In another example, the disclosure is directed to a method that includes detecting, by a wearable computing device that is worn by an individual performing cleaning in an environment, movement associated with the wearable device during a cleaning event. The method further includes detecting, by a camera system external to the wearable computing device, additional data for the individual during the cleaning event. The method also includes determining, by the one or more processors, based on the movement associated with the wearable computing device and the additional data detected by the camera system, whether the individual has performed a prohibited action during the cleaning event. The method further includes, responsive to determining that the individual performed the prohibited action during the cleaning event, performing, by the one or more processors, an operation.

In another example, the disclosure is directed to a method including detecting, by a first wearable computing device that is worn by a first individual performing cleaning in an environment, first movement associated with the first wearable device during a cleaning event. The method further includes detecting, by a second wearable computing device that is worn by a second individual performing cleaning in the environment, second movement associated with the second wearable device during the cleaning event. The method also includes detecting, by a camera system external to the wearable computing device, pose data for each of the first individual and the second individual during the cleaning event. The method further includes determining, by the one or more processors, based on the first movement associated with the first wearable computing device, the second movement associated with the second wearable computing device, and the additional data detected by the camera system, whether one or more of the first individual or the second individual performed a prohibited action. The method also includes, responsive to determining that one or more of the first individual or the second individual performed the prohibited action, performing, by the one or more processors, an operation.

In another example, the disclosure is directed to any method described herein.

In another example, the disclosure is directed to a device configured to perform any of the methods described herein.

In another example, the disclosure is directed to an apparatus comprising means for performing any of the methods described herein.

In another example, the disclosure is directed to a non-transitory computer-readable storage medium having stored thereon instructions that, when executed, cause one or more processors of a computing device to perform any of the methods described herein.

In another example, the disclosure is directed to a system comprising one or more computing devices configured to perform any of the methods described herein.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The following drawings are illustrative of particular examples of the present invention and therefore do not limit the scope of the invention. The drawings are not necessarily to scale, though embodiments can include the scale illustrated, and are intended for use in conjunction with the explanations in the following detailed description wherein like reference characters denote like elements. Examples of the present invention will hereinafter be described in conjunction with the appended drawings.

DETAILED DESCRIPTION

The following detailed description is exemplary in nature and is not intended to limit the scope, applicability, or configuration of the invention. Rather, the following description provides some practical illustrations for implementing examples of the present invention. Those skilled in the art will recognize that many of the noted examples have a variety of suitable alternatives.

Throughout the disclosure, examples are described where a computing system (e.g., a server, etc.) and/or computing device (e.g., a wearable computing device, etc.) may analyze information (e.g., accelerations, orientations, etc.) associated with the computing system and/or computing device. Such examples may be implemented so that the computing system and/or computing device can only perform the analyses after receiving permission from a user (e.g., a person wearing the wearable computing device) to analyze the information. For example, in situations discussed below in which the mobile computing device may collect or may make use of information associated with the user and the computing system and/or computing device, the user may be provided with an opportunity to provide input to control whether programs or features of the computing system and/or computing device can collect and make use of user information (e.g., information about a user's occupation, contacts, work hours, work history, training history, the user's preferences, and/or the user's past and current location), or to dictate whether and/or how to the computing system and/or computing device may receive content that may be relevant to the user. In addition, certain data may be treated in one or more ways before it is stored or used by the computing system and/or computing device, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing system and/or computing device.

Figure 1:
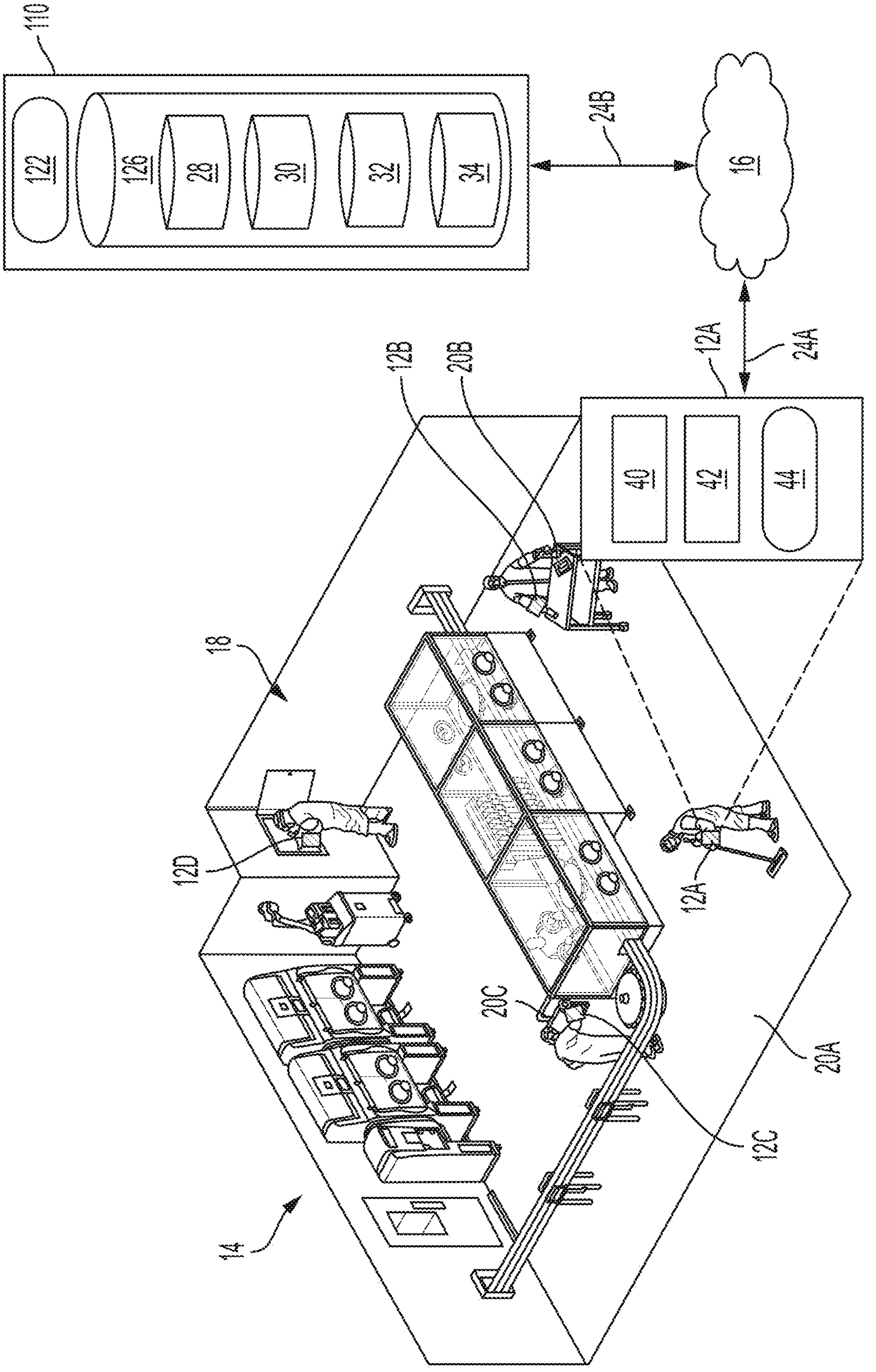
FIG. 1 is a conceptual diagram illustrating an example computing system that is configured to detect whether an individual performed a prohibited action during a cleaning event, in accordance with one or more techniques described herein.

FIG. 1 is a conceptual diagram illustrating an example computing system that is configured to detect whether an individual performed one or more required cleaning actions and/or performed a prohibited action during a cleaning event, in accordance with one or more techniques described herein. In the illustrated example, environment 18 is depicted as a cleanroom, or a controlled environment where pollutants like dust, airborne microbes, and aerosol particles are filtered out in order to provide a defined space of controlled cleanliness. Most cleanrooms are used for manufacturing products such as electronics, pharmaceutical products, and medical equipment. Environment 18 may have one or more target surfaces or objects intended to be cleaned during a cleaning event, such as a floor 20A, a cart 20B, and a monitor 20C, to name a few exemplary surfaces. Other example surfaces may include walls, windows, doors (e.g., door knobs), and equipment in the cleanroom (e.g., manufacturing equipment). Such a cleanroom may be susceptible to contamination by pollutants, making rigorous compliance with hygiene and cleaning protocols important for maintaining the sterility of the cleanroom environment and/or product manufactured therein. That being said, the techniques of the present disclosure are not limited to such an exemplary environment. Rather, the techniques of the disclosure may be utilized at any location where it is desirable to have validated evidence of hygiene compliance. Example environments in which aspects of the present disclosure may be utilized include, but are not limited to, a hospital or medical facility environment, a food preparation environment, a hotel-room environment, a food processing plant, and a dairy farm.

Environment 18 may be divided up into a number of segmented areas. For instance, an area directly outside of environment 18 may include a changing room, which may follow the most lenient protocols for cleanliness (e.g., a level one protocol). Other areas of environment 18, including areas where an individual may be working directly with a piece of equipment, may include areas requiring stricter levels of cleanliness (e.g., a level three protocol). Remote computing device 110, or some other computing device, may segment environment 18 into a plurality of areas, with each area having a respective assigned cleaning protocol. When remote computing device 110 is analyzing actions to determine whether any prohibited actions are performed, the determination may be made taking into account the area the individual was located in and the cleaning protocol level of the respective area.

Wearable computing devices 12A-12D (collectively, wearable computing devices 12) may be any type of computing device, which can be worn, held, or otherwise physically attached to a person, and which includes one or more processors configured to process and analyze indications of movement (e.g., sensor data) of the wearable computing device. Examples of wearable computing devices 12 include, but are not limited to, a watch, an activity tracker, computerized eyewear, a computerized glove, computerized jewelry (e.g., a computerized ring), a mobile phone, or any other combination of hardware, software, and/or firmware that can be used to detect movement of a person who is wearing, holding, or otherwise being attached to wearable computing devices 12. Such wearable computing device may be attached to a person's finger, wrist, arm, torso, or other bodily location sufficient to detect motion associated with the wearer's actions during the performance of a cleaning event. In some examples, wearable computing devices 12 may have a housing attached to a band that is physically secured to (e.g., about) a portion of the wearer's body. In other examples, wearable computing devices 12 may be insertable into a pocket of an article of clothing worn by the wearer without having a separate securing band physically attaching the wearable computing device to the wearer. In other examples, rather than being a watch or some other external device, wearable computing devices 12 may be sewn directly into an article of clothing of a user, including a dressing gown worn in clean rooms on a sleeve, an arm, a chest, a waist, or a leg of the garment.

Although shown in FIG. 1 as a separate element apart from remote computing device 110, in some examples, some or all of the functionality of remote computing device 110 may be implemented by wearable computing device 12. For example, module 122 and data store 126 (which includes sub-data stores 28, 30, and 32) may exist locally at wearable computing devices 12, to receive information regarding movement of the wearable computing device and to perform analyses as described herein. Accordingly, while certain functionalities are described herein as being performed by wearable computing devices 12 and remote computing device 110, respectively, some or all of the functionalities may be shifted from the remote computing system to the wearable computing device, or vice versa, without departing from the scope of disclosure.

The phrase "cleaning action" as used herein refers to an act of cleaning having motion associated with it in multiple dimensions and which may or may not utilize a tool to perform the cleaning. Some examples of cleaning actions include an individual cleaning a specific object (e.g., computer monitor, railing, door knob), optionally with a specific tool (e.g., rag, brush, mop). A cleaning action can include preparatory motion that occurs before delivery of a cleaning force, such as spraying a cleaner on a surface, wringing water from a mop, filling a bucket, soaking a rag, etc.

The term "substantially real time" as used herein means while an individual is still performing cleaning or is in sufficiently close temporal proximity to the termination of the cleaning that the individual is still in or proximate to the environment in which the cleaning occurred to perform a corrective cleaning operation.

The phrase "cleaning operation" as used herein means the performance of a motion indicative of and corresponding to a cleaning motion. A cleaning motion can be one which an individual performs to aid in soil removal, pathogen population reduction, and combinations thereof.

The phrase "reference movement data" as used herein refers to both raw sensor data corresponding to the reference movement(s) and data derived from or based on the raw sensor data corresponding to the reference movement(s). In implementations where reference movement data is derived from or based on the raw sensor data, the reference movement data may provide a more compact representation of the raw sensor data. For example, reference movement data may be stored in the form of one or more window-granularity features, coefficients in a model, or other mathematical transformations of the raw reference data.

In FIG. 1, network 16 represents any public or private communication network. Wearable computing devices 12 and remote computing device 110 may send and receive data across network 16 using any suitable communication techniques. For example, wearable computing device 12 may be operatively coupled to network 16 using network link 24A. Remote computing device 110 may be operatively coupled to network 16 by network link 24B. Network 16 may include network hubs, network switches, network routers, etc., that are operatively inter-coupled thereby providing for the exchange of information between wearable computing device 12 and remote computing device 110. In some examples, network links 24A and 24B may be Ethernet, Bluetooth, ATM or other network connections. Such connections may be wireless and/or wired connections.

Remote computing device 110 of system 10 represents any suitable mobile or stationary remote computing system, such as one or more desktop computers, laptop computers, mobile computers (e.g., mobile phone), mainframes, servers, cloud computing systems, etc. capable of sending and receiving information across network link 24B to network 16. In some examples, remote computing device 110 represents a cloud computing system that provides one or more services through network 16. One or more computing devices, such as wearable computing device 12, may access the one or more services provided by the cloud using remote computing device 110. For example, wearable computing device 12 may store and/or access data in the cloud using remote computing device 110. In some examples, some or all the functionality of remote computing device 110 exists in a mobile computing platform, such as a mobile phone, tablet computer, etc. that may or may not be at the same geographical location as wearable computing device 12. For instance, some or all the functionality of remote computing device 110 may, in some examples, reside in and be execute from within a mobile computing device that is in environment 18 with wearable computing devices 12 and/or reside in and be implemented in the wearable device itself.

In some implementations, wearable computing device 12 can generate and store data indicative of movement for processing by remote computing device 110 even when the wearable computing device is not in communication with the remote computing system. In practice, for example, wearable computing device 12 may periodically lose connectivity with remote computing device 110 and/or network 16. In these and other situations, wearable computing device 12 may operate in an offline/disconnected state to perform the same functions or more limited functions the wearable computing device performs if online/connected with remote computing device 110. When connection is reestablished between computing device 12 and remote computing device 110, the computing device can forward the stored data generated during the period when the device was offline. In different examples, computing device 12 may reestablish connection with remote computing device 110 when wireless connectivity is reestablished via network 16 or when the computing device is connected to a docketing station to facilitate downloading of information temporarily stored on the computing device.

Remote computing device 110 in the example of FIG. 1 includes efficacy determination module 122 and one or more data stores, which is illustrated as including data store 126. Each of the one or more data stores may further include sub-data stores, which are illustrated in FIG. 1 as a target surfaces comparison data store 28, a cleaning quality comparison data store 30, a cleaning action comparison data store 32, and prohibited action data store 34. Efficacy determination module 122 may perform operations described using software, hardware, firmware, or a mixture of hardware, software, and firmware residing in and/or executing at remote computing device 110. Remote computing device 110 may execute efficacy determination module 122 with multiple processors or multiple devices. Remote computing device 110 may execute efficacy determination module 122 as a virtual machine executing on underlying hardware. Efficacy determination module 122 may execute as a service of an operating system or computing platform. Efficacy determination module 122 may execute as one or more executable programs at an application layer of a computing platform.

Features described as data stores can represent any suitable storage medium for storing actual, modeled, or otherwise derived data that efficacy determination module 122 may access to determine whether a wearer of wearable computing devices 12 has performed compliant cleaning behavior. For example, the data stores may contain lookup tables, databases, charts, graphs, functions, equations, and the like that efficacy determination module 122 may access to evaluate data generated by wearable computing devices 12. Efficacy determination module 122 may rely on features generated from the information contained in one or more data stores to determine whether sensor data obtained from wearable computing devices 12 indicates that a person has performed certain cleaning compliance behaviors, such as cleaning all surfaces targeted for cleaning, cleaning one or more target surfaces appropriately thoroughly, and/or performing certain specific cleaning actions. The data stored in the data stores may be generated from and/or based on one or more training sessions. Remote computing device 110 may provide access to the data stored at the data stores as a cloud-based service to devices connected to network 16, such as wearable computing devices 12.

Efficacy determination module 122 may respond to requests for information (e.g., from wearable computing device 12) indicating whether an individual performing cleaning and wearing or having worn wearable computing device 12 has performed compliant cleaning activity or if the individual performed a prohibited action. Efficacy determination module 122 may receive sensor data via link 24B and network 16 from wearable computing device 12 and compare the sensor data to one or more comparison data sets stored in data stores of the remote computing device 110. Efficacy determination module 122 may respond to the request by sending information from remote computing device 110 to wearable computing device 12 through network 16 via links.

Efficacy determination module 122 may be implemented to determine a number of different characteristics of cleaning behavior and compliance with cleaning protocols based on information detected by wearable computing device 12. In general, wearable computing device 12 may output, for transmission to remote computing device 110, information indicative of movement of the wearer (e.g., data indicative of a direction, location, orientation, position, elevation, etc. of wearable computing device 12), as discussed in greater detail below. Efficacy determination module 122 may discriminate movement associated with cleaning action from movement not associated with cleaning action during the cleaning event, or period over which movement data is captured, e.g., with reference to stored data in remote computing device 110. Efficacy determination module 122 may further analyze the movement data associated with cleaning action to determine whether such action is in compliance with one or more standards, e.g., based on comparative data stored in one or more data stores.

In one implementation, an individual performing cleaning may be assigned a schedule of multiple surfaces to be cleaned during a cleaning event. The schedule of surfaces to be cleaned may correspond to surfaces that are frequently touched by individuals in the environment and that are subject to contamination, or otherwise desired to be cleaned as part of a cleaning compliance protocol. The individual performing cleaning may be instructed on which surfaces should be cleaned during a cleaning event and, optionally, and order in which the surfaces should be cleaned and/or a thoroughness with which each surface should be cleaned.

During performance of the cleaning event, wearable computing devices 12 may output information corresponding to movement of the wearable computing device. Efficacy determination module 122 may receive movement data from wearable computing devices 12 and analyze the movement data with reference to target surface comparative data stored at data store 28. Target surface comparative data store 28 may contain data corresponding to cleaning for each of the target surfaces scheduled by the individual performing cleaning to be cleaned.

In some examples, efficacy determination module 122 determines one or more features of the movement data corresponding to cleaning of a particular surface. Each surface targeted for cleaning may have dimensions and/or an orientation within three-dimensional space unique to that target surface and which distinguishes it from each other target surface intended to be cleaned. Accordingly, movement associated with cleaning of each target surface may provide a unique signature, or comparative data set, that distinguishes movement associated with cleaning of each target surface within the data set. The specific features of the data defining the target surface may vary, e.g., depending on the characteristics of the target surface and characteristics of sensor data generated by wearable computing devices 12. Target surface comparative data store 28 may contain data corresponding to cleaning of each target surface intended to be cleaned. For example, target surface comparative data store 28 may contain features generated from reference movement data associated with cleaning of each of the multiple target surfaces scheduled to be cleaned.

Efficacy determination module 122 can analyze one or more features of movement data generated during a cleaning event relative to the features in target surface comparative data store 28 to determine which of the target surfaces the individual has performed a cleaning on. Efficacy determination module 122 can determine if one or more target surfaces scheduled to be cleaned were cleaned or were not, in fact, cleaned based on reference to target surface comparison data store 28, or whether a prohibited action was performed.

Efficacy determination module 122 may analyze one or more features of movement data generated during a cleaning event relative to the features in prohibited action data store 34 to determine if the individual has performed a prohibited action. Remote computing device 110 may communicate with wearable computing device 12 to initiate an operation via the wearable computing device in the event that at least one prohibited action was performed or a risk score for one or more individuals exceeded a threshold risk score. For the purposes of this disclosure, a risk score may indicate the potential likelihood that a totality of activity in the cleanroom may result in a violation of cleanroom policies or procedures, despite the possibility of no single action being a prohibited action in and of itself.

In some examples, a cleaning protocol may specify a sequence of one or more activities to be performed and/or a particular cleaning technique or series of techniques to be used when performing the one or more cleaning activities. Example cleaning activities that may be specified as part of a cleaning protocol include an order of surfaces to be cleaned (e.g., cleaning room from top-to-bottom, wet-to-dry, and/or least-to-most soiled). Example cleaning techniques that may be specified include a specific type of cleaning to be used on a particular surface (e.g., a scrubbing action, using overlapping strokes) and/or a sequential series of cleaning steps to be performed on the particular surface (e.g., removing visible soils followed by disinfection).

During performance of a cleaning event, wearable computing device 12 can output information corresponding to movement of the wearable computing device. Efficacy determination module 122 may receive movement data from wearable computing device 12 and analyze the movement data with reference to cleaning quality comparative data stored at data store 30. Cleaning quality comparative data store 30 may contain data corresponding to a quality of cleaning for the target surface intended to be cleaned by the individual performing clean.

In some examples, efficacy determination module 122 determines one or more features of the movement data corresponding to quality of cleaning of a surface. The movement data may be indicative of amount of work, or intensity, of the cleaning action performed. Additionally or alternatively, the movement data may be indicative of an area of the surface being cleaned (e.g., dimensions and orientation in three-dimensional space), which may indicate whether the individual performing cleaning has cleaned an entirety of the target surface. Still further additionally or alternatively, the movement data may be indicative of the type of cleaning technique, or series of different cleaning techniques, performed on the surface. The specific features of the data defining the quality of cleaning may vary, e.g., depending on the characteristics of the cleaning protocol dictating the quality cleaning, the characteristics of the surface being cleaned, and/or the characteristics of the sensor data generated by wearable computing device 12.

Cleaning quality comparison data store 30 may contain data corresponding to the quality of cleaning of each surface, the quality of cleaning of which is intended to be evaluated. Cleaning quality comparison data store 30 may contain features generated from reference movement data associated with a compliant quality of cleaning for each surface, the quality of cleaning of which is intended to be evaluated. The reference movement data may correspond to a threshold level of cleaning indicated by the originator of the reference movement data as corresponding to a suitable or compliant level of quality.

Efficacy determination module 122 can analyze one or more features of movement data generated during a cleaning event relative to features in cleaning quality comparison data store 30 to determine whether the individual, when cleaning the surface, performed a prohibited action or cleaned the surface such that a risk score threshold was exceeded based on the user's actions. Efficacy determination module 122 can determine whether the individual, when cleaning the surface, performed a prohibited action or cleaned the surface such that a risk score threshold was exceeded based on the user's actions based on reference to cleaning quality comparison data store 30. Remote computing device 110 may communicate with wearable computing device 12 to initiate an operation via the wearable computing device in the event that it was determined that the risk score threshold was exceeded and/or a prohibited action was performed.

As another example implementation, an individual performing cleaning may be assigned multiple cleaning actions to be performed as part of a protocol of work. Each specific type of cleaning action may be different than each other specific type of cleaning action and, in some examples, may desirably be performed in a specified order. For example, one type of cleaning action that may be performed is an environmental cleaning action in which one or more surfaces in environment 18 are desired to be cleaned. Examples of these types of cleaning actions include floor surface cleaning actions (e.g., sweeping, mopping) and non-floor surface cleaning actions (e.g., cleaning equipment within an environment 18).

For example, wearable computing devices 12 may output information corresponding to movement of the wearable computing device during a period of time in which the wearer performs multiple cleaning actions as well as non-cleaning actions. Efficacy determination module 122 may receive movement data from wearable computing device 12 and analyze the movement data with reference to cleaning action comparison data store 32. Cleaning action comparison data store 32 may contain data corresponding to multiple different types of cleaning actions that may be performed by an individual wearing wearable computing device 12. Each type of cleaning action may have a movement signature associated with it that is stored in cleaning action comparison data store 32.

Efficacy determination module 122 may distinguish movement data associated with cleaning actions from movement data associated with non-cleaning actions with reference to cleaning action comparison data store 32 and prohibited action data store 34. Efficacy determination module 122 may further determine a specific type of cleaning action(s) performed by the wearer of wearable computing device 12 with reference to cleaning action comparison data store 32 and/or prohibited action data store 34. In some implementations, efficacy determination module 122 may further determine a quality of clean for one or more of the specific types of cleaning actions performed by the ware with further reference to cleaning quality comparison data store 30. Additionally, prohibited data store 34 may include different prohibited action information for various cleaning level protocols. For instance, prohibited data store 34 may include a first set of prohibited actions for a first protocol level, a second set of prohibited actions for a second protocol level, a third set of prohibited actions for a third protocol level, and so on for however, many protocol levels are implemented in the particular environment 18.

In some examples, efficacy determination module 122 determines one or more features of the movement data corresponding to the multiple cleaning actions performed by the wearer. Each cleaning action may have movement data associated with it that distinguishes it from each other type of cleaning action. Accordingly, movement data generated during the performance of multiple cleaning actions can allow each specific cleaning action to be distinguished from each other specific cleaning action. The specific features of the data defining a specific cleaning action may vary, e.g., depending on the type of cleaning action performed and the characteristics of the sensor data generated by wearable computing device 12. Cleaning action comparison data store 32 and/or prohibited action data store 34 may contain data distinguishing cleaning movement from non-cleaning movement. Cleaning action comparison data store 32 and/or prohibited action data store 34 may further contain data corresponding to each type of cleaning action, the compliance of which is intended to be evaluated. For example, cleaning action compliance data store 32 and/or prohibited action data store 34 may contain features generated from reference movement data associated with each type of cleaning action that may be determined from movement data.

Efficacy determination module 122 can analyze one or more features of movement generated during the course of movement relative to the features defining different cleaning actions. For example, efficacy determination module 122 can analyze one or more features of movement data generated during the duration of movement (e.g., cleaning event) to distinguish periods of movement corresponding to cleaning action from periods of movement corresponding to non-cleaning actions, e.g., with reference to cleaning action compliance data store 32 and/or prohibited action data store 34. Additionally or alternatively, efficacy determination module 122 can analyze one or more features of movement corresponding to periods of cleaning to determine specific types of cleaning actions performed during each period of cleaning, e.g., with reference to cleaning action compliance data store 32 and/or prohibited action data store 34, and whether any of those actions constitute prohibited actions. Cleaning action compliance data store 32 may further determine whether one or more of the specific types of cleaning actions performed were performed with a threshold level of quality, e.g., with reference to clean quality comparison data store 30.

In some examples, efficacy determination module 122 can analyze one or more features of movement data generated during the duration of movement to distinguish periods of movement corresponding to cleaning action from periods of movement corresponding to non-cleaning actions, e.g., with reference to cleaning action compliance data store 32. Efficacy determination module 122 can further analyze the one or more features of movement data, e.g., with reference to cleaning action compliance data store 32, to determine whether a specified order of cleaning was performed (e.g., cleaning room from top-to-bottom, wet-to-dry, and/or least-to-most soiled). Additionally or alternatively, efficacy determination module 122 can further analyze the one or more features of movement data, e.g., with reference to cleaning action compliance data store 32, to determine whether a particular surface has been cleaned used a specified technique or specified series of techniques (e.g., a scrubbing action, using overlapping strokes, removing visible soils followed by disinfection). Additionally or alternatively, efficacy determination module 122 can further analyze the one or more features of movement data, e.g., with reference to prohibited action data store 34, to determine whether one or more prohibited actions were performed during a cleaning event.

Remote computing device 110 may communicate with wearable computing device 12 to initiate an operation via the wearable computing device in the event that the cleaning activity performed does not comply with protocol standards, such as a specific type of cleaning action expected to be performed having not been performed, a specific type of cleaning action having been performed to less than a threshold level of cleaning quality, and/or a prohibited action having been performed by the individual wearing the wearable device.

In some examples, wearable computing device 12 may output, for transmission to remote computing system 110, information comprising an indication of movement (e.g., data indicative of a direction, speed, location, orientation, position, elevation, etc.) of wearable computing device 12. Responsive to outputting the information comprising the indication of movement, wearable computing device 12 may receive, from remote computing device 110, information concerning a risk score for contamination of environment 18 and/or whether a prohibited action was performed during the cleaning of environment 18. The information may indicate that the individual performing cleaning and wearing wearable computing device 12 has performed a cleaning operation on all surfaces targeted for cleaning or, conversely, has not performed a cleaning operation on at least one surface targeted for cleaning. Additionally or alternatively, the information may indicate that the individual performing cleaning and wearing wearable computing device 12 has performed cleaning to a threshold level of quality or, conversely, has not performed cleaning to a threshold level of quality. As still a further example, the information may indicate that the individual performing cleaning and wearing wearable computing device 12 has not performed a specific type of cleaning action expected to be performed as part of a stored cleaning protocol and/or the individual has performed the specific type of cleaning action but has not performed it to the threshold level of quality and/or in the wrong order. As still a further example, the information may indicate that the individual performing cleaning and wearing wearable computing device 12 has or has not performed a prohibited action.

In the example of FIG. 1, wearable computing device 12 is illustrated as a wrist-mounted device, such as a watch or activity tracker. Wearable computing device 12 can be implemented using a variety of different hardware devices, as discussed above. Independent of the specific type of device used as wearable computing device 12, the device may be configured with a variety of features and functionalities.

In the example of FIG. 1, wearable computing device 12A is illustrated as including a user interface 40. User interface

40 of wearable computing device 12A may function as an input device for wearable computing device 12A and as an output device. User interface 40 may be implemented using various technologies. For instance, user interface 40 may function as an input device using a microphone and as an output device using a speaker to provide an audio-based user interface. User interface 40 may function as an input device using a presence-sensitive input display, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. User interface 40 may function as an output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to the user of wearable computing device 12A.

User interface 40 of wearable computing device 12A may include physically-depressible buttons and/or a presence-sensitive display that may receive tactile input from a user of wearable computing device 12A. User interface 40 may receive indications of the tactile input by detecting one or more gestures from a user of wearable computing device 12A (e.g., the user touching or pointing to one or more locations of user interface 40 with a finger or a stylus pen). User interface 40 may present output to a user, for instance at a presence-sensitive display. User interface 40 may present the output as a graphical user interface which may be associated with functionality provided by wearable computing device 12A. For example, user interface 40 may present various user interfaces of applications executing at or accessible by wearable computing device 12A (e.g., an electronic message application, an Internet browser application, etc.). A user may interact with a respective user interface of an application to cause wearable computing device 12 to perform operations relating to a function. Additionally or alternatively, user interface 40 may present tactile feedback, e.g., through a haptic generator.

FIG. 1 shows that wearable computing device 12A includes one or more sensor devices 42 (also referred to herein as "sensor 42") for generating data corresponding to movement of the device in three-dimensional space. Many examples of sensor devices 42 exist including microphones, cameras, accelerometers, gyroscopes, magnetometers, thermometers, galvanic skin response sensors, pressure sensors, barometers, ambient light sensors, heart rate monitors, altimeters, and the like. In some examples, wearable computing device 12A may include a global positioning system (GPS) radio for receiving GPS signals (e.g., from a GPS satellite) having location and sensor data corresponding to the current location of wearable computing device 12A as part of the one or more sensor devices 42. Sensor 42 may generate data indicative of movement of wearable computing device in one or more dimensions and output the movement data to one or more modules of wearable computing device 12A, such as module 44. In some implementations, sensor device 42 is implemented using a 3-axis accelerometer. Additionally or alternatively, sensor device 42 may be implemented using a 3-axis gyroscope.

Wearable computing device 12A may include a user interface module 44 and, optionally, additional modules (e.g., efficacy determination module 122). Each module may perform operations described using software, hardware, firmware, or a mixture of hardware, software, and firmware residing in and/or executing at wearable computing device 12A. Wearable computing device 12A may execute each module with one or multiple processors. Wearable computing device 12A may execute each module as a virtual machine executing on underlying hardware. Each module may execute as one or more services of an operating system and/or a computing platform. Each module may execute as one or more remote computing services, such as one or more services provided by a cloud and/or cluster-based computing system. Each module may execute as one or more executable programs at an application layer of a computing platform.

User interface module 44 may function as a main control module of wearable computing device 12A by not only providing user interface functionality associated with wearable computing device 12A, but also by acting as an intermediary between other modules (e.g., module 46) of wearable computing device 12 and other components (e.g., user interface 40, sensor device 42), as well as remote computing device 110 and/or network 16. By acting as an intermediary or control module on behalf of wearable computing device 12A, user interface module 44 may ensure that wearable computing device 12A provides stable and expected functionality to a user. User interface module 44 may rely on machine learning or other type of rules based or probabilistic artificial intelligence techniques to control how wearable computing device 12 operates.

User interface module 44 may cause user interface 40 to perform one or more operations, e.g., in response to one or more cleaning determinations made by efficacy determination module 122. For example, user interface module 44 may cause user interface 40 to present audio (e.g., sounds), graphics, or other types of output (e.g., haptic feedback, etc.) associated with a user interface. The output may be responsive to one or more cleaning determinations made and, in some examples, may provide cleaning information to the wearer of wearable computing device 12 to correct cleaning behavior determined to be noncompliant.

For example, user interface module 44 may receive information via network 16 from efficacy determination module 122 that causes user interface module 44 to control user interface 40 to output information to the wearer of wearable computing device 12. For instance, when efficacy determination module 122 determines whether or not the user has performed certain compliant cleaning behavior (e.g., performed a cleaning operation on each surface targeted for cleaning, cleaned a target surface to a threshold quality of cleaning, and/or performed a specific type of cleaning action and/or perform such action to a threshold quality of cleaning) and/or certain non-compliant behavior (e.g., prohibited action(s)), user interface module 44 may receive information via network 16 corresponding to the determination made by efficacy determination module 122. Responsive to determining that wearable computing device 12 has or has not performed certain compliant behavior, user interface module 44 may control wearable computing device 12 to perform an operation, examples of which are discussed in greater detail below.

Efficacy information determined by system 10 may be used in a variety of different ways. As noted, the efficacy information can be evaluated to determine whether a prohibited action was performed or whether a risk score for the cleaning event exceeds a threshold risk score. As another example, the efficacy information can be stored for a cleaning event, providing validation information for the environment being cleaned. Additionally or alternatively, the efficacy information can be communicated to a scheduling module, e.g., executing on system 10 or another computing system, which schedules the availability of certain resources in the environment in which the cleaning operation is being performed. Cleaning efficacy information determined by system 10 can be communicated to the scheduling module to determine when a resource (e.g., room, equipment) is projected to be cleaned and/or cleaning is complete. For example, the scheduling module may determine that a resource is projected to be available in a certain period of time (e.g., X minutes) based on substantially real-time cleaning efficacy and progress information generated by system 10. The scheduling module can then schedule a subsequent use of the resource based on this information.

As another example, cleaning efficacy information determined by system 10 may be used to train and/or incentivize a cleaner using the system. Computing system 10 may include or communicate with an incentive system that issues one or more incentives to a cleaner using the system based on cleaning performance monitored by wearable computing device 12. The incentive system may issue a commendation (e.g., an encouraging message issued via user interface 40 and/or via e-mail and/or textual message) and/or rewards (e.g., monetary rewards, prizes) in response to an individual user meeting one or more goals (e.g., efficiency goals, quality goals) as determined based on motion data generated by the wearable computing device worn by the user.

Figure 2:
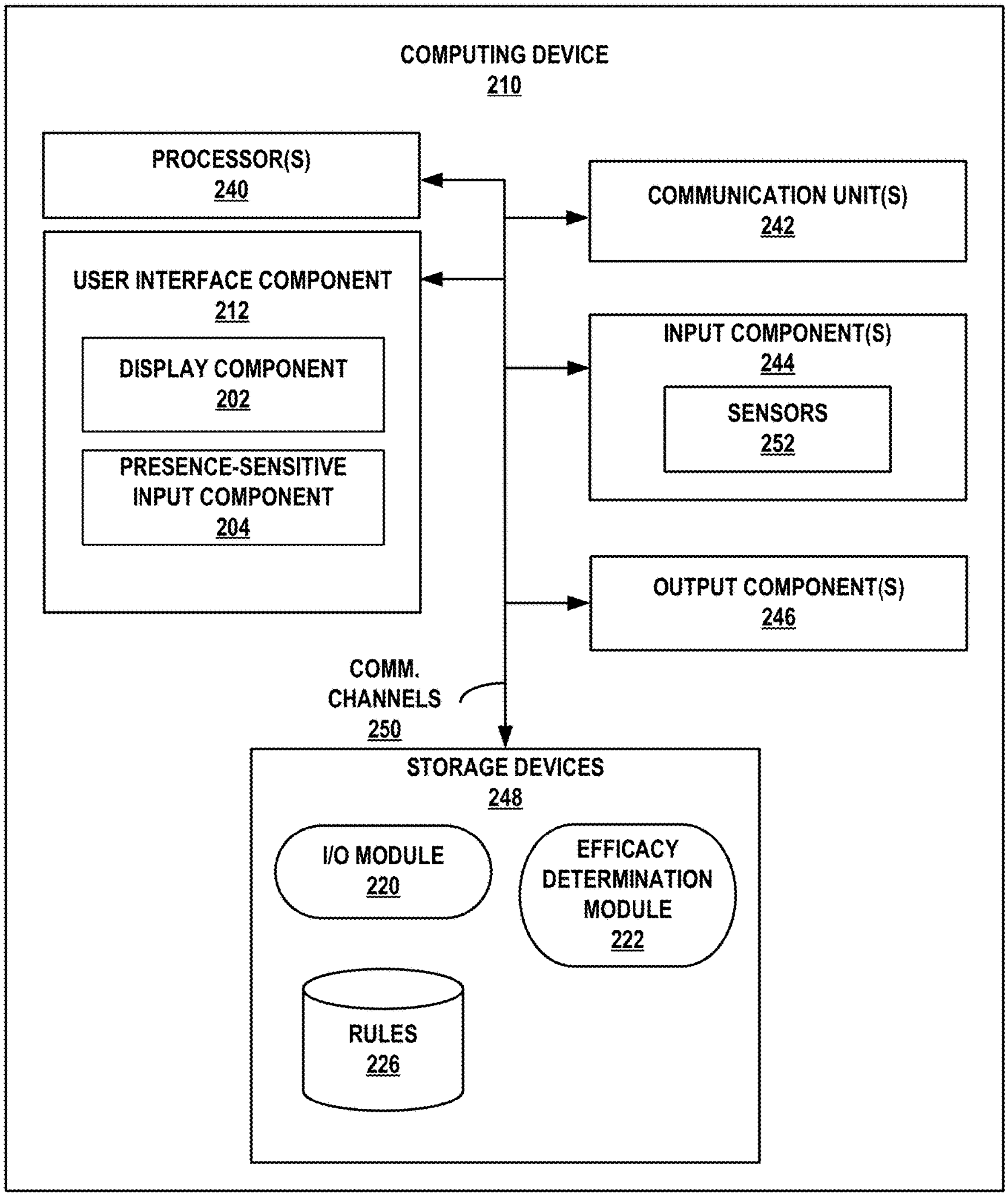
FIG. 2 is a block diagram illustrating a more detailed example of a computing device configured to perform the techniques described herein.

By providing cleaning and behavior compliance surveillance and control according to one or more aspects of the present disclosure, users of the technology may reduce contamination incidents associated with performing prohibited actions and/or through ineffective or incomplete cleaning. For example, cleanroom operations can ensure all surfaces intended to be cleaned during a cleaning event were, in fact, cleaned and/or cleaned with a requisite level of thoroughness. Additionally, cleanroom operations can ensure that individuals entering the cleanroom and performing cleaning do not perform actions that a contamination risk, undermining the effectiveness of the cleaning event FIG. 2 is a block diagram illustrating a more detailed example of a computing device configured to perform the techniques described herein. Computing device 210 of FIG. 2 is described below as an example of remote computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2. For instance, computing device 210 may also be an example of any wearable devices 12 in examples where wearable devices 12 include the functionality of remote computing device 110.

Computing device 210 may be any computer with the processing power required to adequately execute the techniques described herein. For instance, computing device 210 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, or a computing device including sensors sewn into a garment or gown, etc.), a virtual reality/augmented reality/extended reality (VR/AR/XR) system, a video game or streaming system, a network modem, router, or server system, or any other computerized device that may be configured to perform the techniques described herein.

As shown in the example of FIG. 2, computing device 210 includes user interface component (UIC) 212, one or more processors 240, one or more communication units 242, one or more input components 244, one or more output components 246, and one or more storage components 248. UIC 212 includes display component 202 and presence-sensitive input component 204. Storage components 248 of computing device 210 include I/O module 220, efficacy determination module 222, and rules data store 226. Rules data store 226 may be similar to data store 126 of FIG. 1, and may include similar sub-data stores.

One or more processors 240 may implement functionality and/or execute instructions associated with computing device 210 to dynamically determine whether an individual performed a prohibited action during a cleaning event. That is, processors 240 may implement functionality and/or execute instructions associated with computing device 210 to analyze movement information and/or pose data for one or more individuals to determine if any one or more of those individuals performed a prohibited action during a cleaning event or if a risk score for the cleaning event exceeds a threshold risk score.

Examples of processors 240 include application processors, display controllers, auxiliary processors, one or more sensor hubs, and any other hardware configured to function as a processor, a processing unit, or a processing device. Modules 220 and 222 may be operable by processors 240 to perform various actions, operations, or functions of computing device 210. For example, processors 240 of computing device 210 may retrieve and execute instructions stored by storage components 248 that cause processors 240 to perform the operations described with respect to modules 220 and 222. The instructions, when executed by processors 240, may cause computing device 210 to dynamically determine whether an individual performed a prohibited action during a cleaning event.

I/O module 220 may execute locally (e.g., at processors 240) to provide functions associated with managing input and output into computing device 210, for example, for facilitating interactions between computing device 110 and application 218. In some examples, I/O module 220 may act as an interface to a remote service accessible to computing device 210. For example, I/O module 220 may be an interface or application programming interface (API) to a remote server that facilitates interactions with wearable computing devices.

In some examples, efficacy determination module 222 may execute locally (e.g., at processors 240) to provide functions associated with dynamically determining whether an individual performed a prohibited action during a cleaning event. In some examples, user input module 222 and IE generation module 224 may act as an interface to a remote service accessible to computing device 210. For example, context module 222 and IE generation module 224 may each be an interface or application programming interface (API) to a remote server that analyzes movement information and/or pose data for one or more individuals to determine if any one or more of those individuals performed a prohibited action during a cleaning event or if a risk score for the cleaning event exceeds a threshold risk score.

One or more storage components 248 within computing device 210 may store information for processing during operation of computing device 210 (e.g., computing device 210 may store data accessed by modules 220 and 222 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220 and 222, and data store 226. Storage components 248 may include a memory configured to store data or other information associated with modules 220 and 222, and data store 226.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on one or more networks. Examples of communication units 242 include a network interface card (e.g., such as an Ethernet card), an optical transceiver, a radio frequency transceiver, a GPS receiver, a radio-frequency identification (RFID) transceiver, a near-field communication (NFC) transceiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, include a presence-sensitive input device (e.g., a touch sensitive screen, a PSD), mouse, keyboard, voice responsive system, camera, microphone or any other type of device for detecting input from a human or machine. In some examples, input components 244 may include one or more sensor components (e.g., sensors 252). Sensors 252 may include one or more biometric sensors (e.g., fingerprint sensors, retina scanners, vocal input sensors/microphones, facial recognition sensors, cameras), one or more location sensors (e.g., GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, or a step counter sensor.

One or more output components 246 of computing device 210 may generate output in a selected modality. Examples of modalities may include a tactile notification, audible notification, visual notification, machine generated voice notification, or other modalities. Output components 246 of computing device 210, in one example, include a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality.

UIC 212 of computing device 210 may include display component 202 and presence-sensitive input component 204. Display component 202 may be a screen, such as any of the displays or systems described with respect to output components 246, at which information (e.g., a visual indication) is displayed by UIC 212 while presence-sensitive input component 204 may detect an object at and/or near display component 202.

While illustrated as an internal component of computing device 210, UIC 212 may also represent an external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging or housing of computing device 210 (e.g., a monitor, a projector, etc. that shares a wired and/or wireless data path with computing device 210).

UIC 212 of computing device 210 may detect two-dimensional and/or three-dimensional gestures as input from a user of computing device 210. For instance, a sensor of UIC 212 may detect a user's movement (e.g., moving a hand, an arm, a pen, a stylus, a tactile object, etc.) within a threshold distance of the sensor of UIC 212. UIC 212 may determine a two or three-dimensional vector representation of the movement and correlate the vector representation to a gesture input (e.g., a hand-wave, a pinch, a clap, a pen stroke, etc.) that has multiple dimensions. In other words, UIC 212 can detect a multi-dimension gesture without requiring the user to gesture at or near a screen or surface at which UIC 212 outputs information for display. Instead, UIC 212 can detect a multi-dimensional gesture performed at or near a sensor which may or may not be located near the screen or surface at which UIC 212 outputs information for display.

In accordance with the techniques of this disclosure, a wearable computing device (which, in some instances, may include sensors 252 of computing device 210 or a different device external to computing device 210) that is worn by an individual performing cleaning in an environment, may detect movement associated with the wearable device during a cleaning event. In some instances, the environment may be one or more of a cleanroom and one or more ancillary controlled spaces.

Efficacy determination module 222 may determine, based on the movement associated with the wearable computing device detected during the cleaning event, whether the individual has performed a prohibited action during the cleaning event. The prohibited action may include any one or more of the individual improperly interacting with their body, the individual improperly contacting a surface in the environment, the individual placing themselves in an improper state, and the individual improperly moving throughout the environment.

In some instances, in detecting the movement associated with the wearable computing device, at least one sensor of the wearable computing device may detect movement data. In such instances, when determining whether the individual has performed the prohibited action during the cleaning event, efficacy determination module 222 may determine at least one signal feature for the movement data and compare the at least one signal feature for the movement data to reference signal feature data associated with the prohibited action.

In addition to, or alternative to, determining whether the individual performed a prohibited action, efficacy determination module 222 may further analyze the detected movement associated with the wearable computing device to determine whether the individual used proper cleaning techniques in their actions. For instance, efficacy determination module 222 may analyze a user's motions and compare the detected motions and the associated motion data with data indicating proper technique stored in rules data store 226. Based on the motion data substantially matching the stored proper technique data (e.g., within a certain threshold percentage variance of the proper data, such as 75%, 85%, 90%, 95%, 99%, etc.), efficacy determination module 222 may determine that proper technique was used in cleaning.

Responsive to determining that the individual performed the prohibited action during the cleaning event, I/O module 220 may perform an operation. In some instances, in performing the operation, I/O module 220 may issue one of an audible, a tactile, and a visual alert via the wearable computing device. In other instances, in performing the operation, I/O module 220 may issue a user alert to a computing device separate from the wearable computing device indicating the prohibited action.

In some instances, I/O module 220 may further receive an indication that the individual performing cleaning has deviated from a planned cleaning protocol during the cleaning event. I/O module 220 may receive this indication either through a detection of an accidental deviation from an expected course of action in the cleaning plan or from a user-input indication that the individual is changing the cleaning plan.

In some examples, efficacy determination module 222 may further determine, based on the movement associated with the wearable computing device detected during the cleaning event, a risk score for the cleaning event. In determining the risk score, efficacy determination module 222 may determine whether the individual performed one or more non-compliant cleaning movements. Responsive to determining that the individual performed the one or more non-compliant cleaning movements, efficacy determination module 222 may increase the risk score based on a weighted model and the one or more non-compliant cleaning movements. The one or more non-compliant cleaning movements could include any one or more of an improper record of gowning, a non-compliant surface wiping motion, a non-compliant equipment wiping motion, a failure to disinfect during a material transfer, improper hand hygiene, improper wall mopping, improper HEPA vacuuming, an improper paper fold, improper floor mopping, and an improper cleaning spray distribution. Responsive to the risk score exceeding the threshold risk score, I/O module 220 may output a fail indication for the cleaning event.

In some instances, computing device 210 may be the wearable computing device. In other instances, the wearable computing device may transmit the movement data to I/O module 220 and computing device 210 using wireless communication.

In some examples, one or more sensors external to the wearable computing device and computing device 210 may detect additional data indicative of one or more activity states experienced by the individual during the cleaning event. The use of additional sensors can be beneficial to provide information and insights not readily discernible through motion data. For example, the use of additional sensors can help detect prohibited and/or compliant behaviors and/or actions that do not have a readily identifiable motion signature. One example of such a prohibited behavior may leaning against a wall surface or otherwise contact a surface that should not be touched, which may not present a discernable motion signature associated with contact of the surface. Efficacy determination module 222 may determine, based on the movement associated with the wearable computing device and the additional data detected by the one or more sensors, whether the user performed the prohibited action during the cleaning event.

Additionally or alternatively, efficacy determination module 222 may determine using a model in rules data store 226, and based on the movement associated with the wearable computing device and the additional data detected by the one or more sensors, a multi-stream risk score for the individual during the cleaning event. The model may include a plurality of weights, each weight corresponding to a potential action detected by one of the wearable computing device or one of the one or more sensors external to the wearable computing device.

Examples of these additional sensors could include any one or more of a camera system, a pressure sensor system, an audio sensor system, a radio detection and ranging system, a light detection and ranging system, a proximity sensor system, and a thermal imaging system. For instance, if the one or more additional sensors include the camera system, the additional data may include one or more of pose data for the individual during the cleaning event, image data for the individual during the cleaning event, and video data for the individual during the cleaning event. More specific examples of the additional data could be data that is indicative of one or more of that hair of the individual is exposed, that skin of the individual is exposed, that a position of the individual is improper during the cleaning event, that a form of the individual is improper during the cleaning event, that the individual has touched outside surfaces while gowned, that the individual gowned in an improper order, that a gown worn by the individual is not a correct size, that the gown worn by the individual has an incorrect fit, movement speed, proximity information, occupancy information, and self-sanitation compliance.

In such instances, examples of the prohibited action include one or more of a movement (e.g., motion) speed of the individual performing cleaning exceeding a threshold movement speed, the individual touching a face while wearing a glove, the individual scratching a body while wearing the glove, the individual bending over, the individual leaning against a wall, the individual placing one or more arms on a countertop, the individual crossing one or more zones in a wrong order, a material transfer without proper sanitation, a cart transfer into a wrong area, a violation of proximity limits, a violation of occupancy limits, entering a space without access permission, and insufficient airlock settling time between instances of a door opening.

In some examples, when efficacy determination module 222 is utilizing data from multiple sources, efficacy determination module 222 may synchronize a clock on the wearable device and a clock on the one or more sensors. Efficacy determination module 222 may also interleave the movement associated with the wearable computing device and the additional data detected by the one or more sensors based on timestamps associated with the movement and timestamps associated with the additional data such that efficacy determination module 222 may determine additional information about potential actions from the user by aligning the times at which the data was detected from the multiple sources.

In accordance with some techniques of this disclosure, a wearable computing device (which, in some instances, may include sensors 252 of computing device 210 or a different device external to computing device 210) that is worn by an individual performing cleaning in an environment, may detect movement associated with the wearable device during a cleaning event. In some instances, the environment may be one or more of a cleanroom and one or more ancillary controlled spaces.

Additionally, a camera system (which, in some instances, may include sensors 252 of computing device 210 or a different device external to computing device 210) external to the wearable computing device may detect additional data for the individual during the cleaning event. Efficacy determination module 222 may determine, based on the movement associated with the wearable computing device and the additional data detected by the camera system, whether the individual has performed a prohibited action during the cleaning event. The prohibited action may include any one or more of the individual improperly interacting with their body, the individual improperly contacting a surface in the environment, the individual placing themselves in an improper state, and the individual improperly moving throughout the environment.

In some instances, in detecting the movement associated with the wearable computing device, at least one sensor of the wearable computing device may detect movement data. In such instances, in determining whether the individual has performed the prohibited action during the cleaning event, efficacy determination module 222 may determine at least one signal feature for the movement data and compare the at least one signal feature for the movement data to reference signal feature data associated with the prohibited action.

Responsive to determining that the individual performed the prohibited action during the cleaning event, I/O module 220 may perform an operation. In some instances, in performing the operation, I/O module 220 may issue one of an audible, a tactile, and a visual alert via the wearable computing device. In other instances, in performing the operation, I/O module 220 may issue a user alert to a computing device separate from the wearable computing device indicating the prohibited action.

Additionally or alternatively, efficacy determination module 222 may determine using a model in rules data store 226, and based on the movement associated with the wearable computing device and the additional data detected by the one or more sensors, a multi-stream risk score for the individual during the cleaning event. The model may include a plurality of weights, each weight corresponding to a potential action detected by one of the wearable computing device or one of the one or more sensors external to the wearable computing device.

Examples of these additional sensors could include any one or more of a camera system, a pressure sensor system, an audio sensor system, a radio detection and ranging system, a light detection and ranging system, a proximity sensor system, and a thermal imaging system. For instance, if the one or more additional sensors include the camera system, the additional data may include one or more of pose data for the individual during the cleaning event, image data for the individual during the cleaning event, and video data for the individual during the cleaning event. More specific examples of the additional data could be data that is indicative of one or more of that hair of the individual is exposed, that skin of the individual is exposed, that a position of the individual is improper during the cleaning event, that a form of the individual is improper during the cleaning event, that the individual has touched outside surfaces while gowned, that the individual gowned in an improper order, that a gown worn by the individual is not a correct size, that the gown worn by the individual has an incorrect fit, movement speed, proximity information, occupancy information, and self-sanitation compliance.

In such instances, examples of the prohibited action include one or more of a movement speed exceeding a threshold movement speed, the individual touching a face while wearing a glove, the individual scratching a body while wearing the glove, the individual bending over, the individual leaning against a wall, the individual placing one or more arms on a countertop, the individual crossing one or more zones in a wrong order, a material transfer without proper sanitation, a cart transfer into a wrong area, a violation of proximity limits, a violation of occupancy limits, entering a space without access permission, and insufficient airlock settling time between instances of a door opening.

In some examples, when efficacy determination module 222 is utilizing data from multiple sources, efficacy determination module 222 may synchronize a clock on the wearable device and a clock on the one or more sensors. Efficacy determination module 222 may also interleave the movement associated with the wearable computing device and the additional data detected by the one or more sensors based on timestamps associated with the movement and timestamps associated with the additional data such that efficacy determination module 222 may determine additional information about potential actions from the user by aligning the times at which the data was detected from the multiple sources.

In some further examples, efficacy determination module 222 may determine, based on the movement associated with the wearable computing device detected during the cleaning event, a risk score for the cleaning event. Responsive to the risk score exceeding the threshold risk score, I/O module 220 may output a fail indication for the cleaning event.

In determining the risk score, efficacy determination module 222 may determine whether the individual performed one or more non-compliant cleaning movements. Responsive to determining that the individual performed the one or more non-compliant cleaning movements, efficacy determination module 222 may increase the risk score based on a weighted model and the one or more non-compliant cleaning movements.

In such instances, the one or more non-compliant cleaning movements may include any one or more of an improper record of gowning, a non-compliant surface wiping motion, a non-compliant equipment wiping motion, a failure to disinfect during a material transfer, improper hand hygiene, improper wall mopping, improper HEPA vacuuming, an improper paper fold, and an improper cleaning spray distribution.

In accordance with some techniques of this disclosure, a first wearable computing device (which, in some instances, may include sensors 252 of computing device 210 or a different device external to computing device 210) that is worn by a first individual performing cleaning in an environment may detect first movement associated with the first wearable device during a cleaning event. A second wearable computing device (which, in some instances, may include sensors 252 of computing device 210 or a different device external to computing device 210) that is worn by a second individual performing cleaning in the environment may further detect second movement associated with the second wearable device during the cleaning event. Additionally, a camera system external to the wearable computing device may detect pose data for each of the first individual and the second individual during the cleaning event. Efficacy determination module 222 may determine, based on the first movement associated with the first wearable computing device, the second movement associated with the second wearable computing device, and the additional data detected by the camera system, whether one or more of the first individual or the second individual performed a prohibited action, In some instances, the prohibited action could be a prohibited action performed by a particular individual. In other instances, both the first and second individuals may perform individually compliant actions, but the specific combination or timing of those compliant actions may result in the performance of a combined prohibited action. In either instance, responsive to determining that one or more of the first individual or the second individual performed the prohibited action, I/O module 220 may perform an operation.

In any of the above examples, computing device 210 may divide up the environment into a number of segmented areas. For instance, the environment may include a changing room, which may follow a comparatively lenient protocol for cleanliness (e.g., a level nine protocol). Other areas of the environment, including areas where an individual may be working directly with a piece of equipment or specimens, may include areas requiring stricter levels of cleanliness (e.g., a level three protocol). Efficacy determination module 222, or some other computing device, may segment the environment into a plurality of areas, with each area having a respective assigned cleaning protocol. When efficacy determination module 222 is analyzing actions to determine whether any prohibited actions are performed, the determination may be made taking into account the area the individual was located in and the cleaning protocol level of the respective area.

Figure 3:
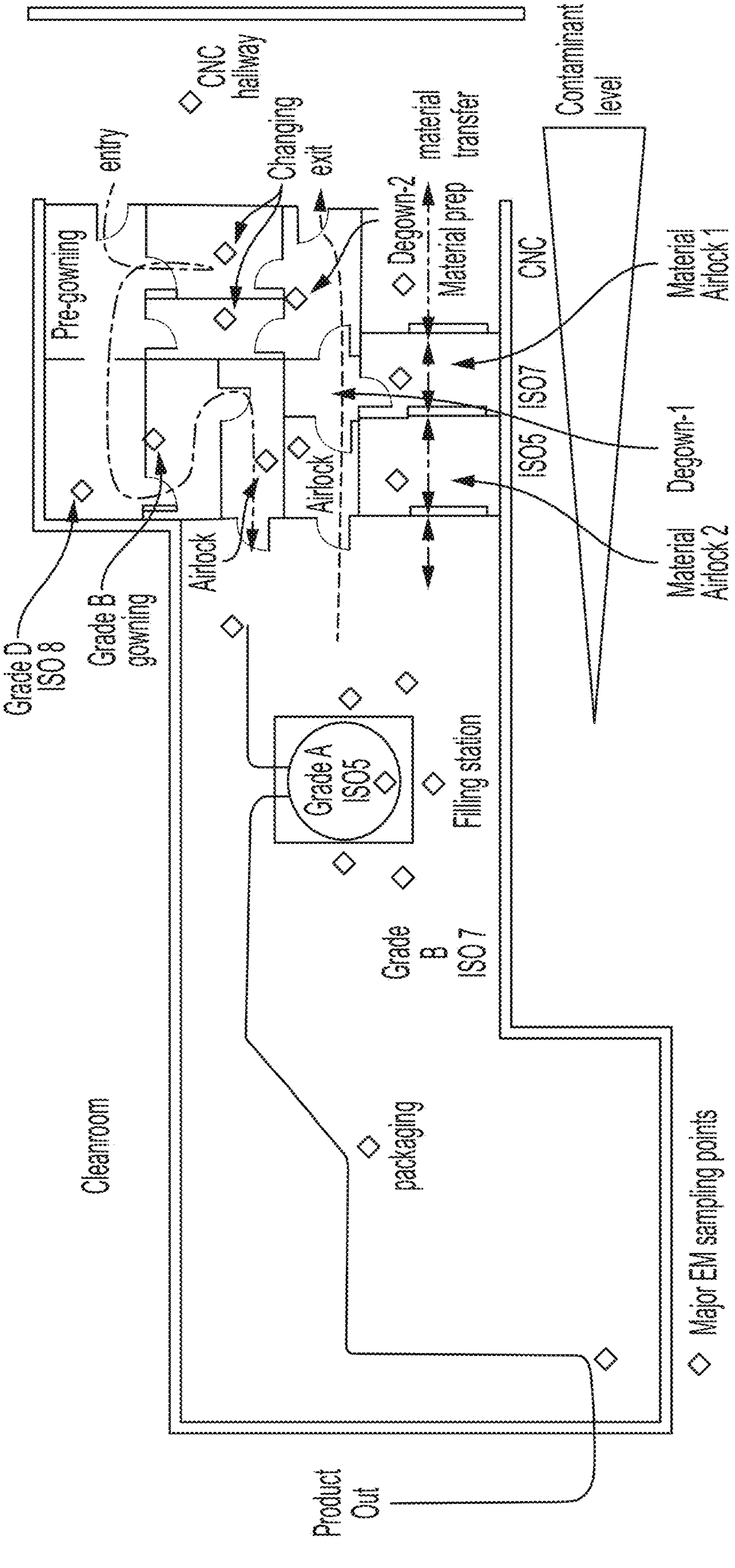
FIG. 3 is a conceptual diagram illustrating an example clean room, in accordance with one or more techniques described herein.

FIG. 3 is a conceptual diagram illustrating an example clean room, in accordance with one or more techniques described herein. Typical cleanroom occupants, by role, generally include production staff, quality control staff, maintenance staff, and cleaning staff.

Current techniques do not include a monitoring method that works for all applications, not just microbial monitoring. The current minimum monitoring plan may include monitoring temperature, humidity, pressure, and total air particulate monitoring. This plan may only provide integrated indicators for viable airborne particulate, surface viable particulates, personnel viable particulates, and liquid bioburden filtration and endotoxin. Manual, discontinuous factors typically take anywhere from 2 to 14 days to result. Rapid factors include anything faster than growth methods, which is generally less than or equal to 2 days.

Microbial contamination is a significant risk. Out of 2196 drug and biologic recalls by FDA in 2020, 646 (29%) were from microbial contamination. Airborne transfer of microbials has a greater risk than personnel contact, which has a greater risk than surface contact. The below table includes indications of potential microbial contamination sources and corresponding example thresholds.

TABLE 2

The importance of sources of airborne microbial contamination in a pharmaceutical cleanroom and clean zone.

| Risk Importance | Source of microbial contamination | NMD |
|---|---|---|
| 1 | Filling workstation (EU GGMP grade A) filters - air drawn from filling cleanroom, 100% leak in filter directly above vials | $3.6 \times 10^{-4}$ |
| 2 | Closures hopper - airborne MCPs in UDAF workstation depositing onto closures in hopper without lid | $6.3 \times 10^{-5}$ |
| 3 | Filling workstation (EU GGMP grade A) - airborne MCPs within the UDAF workstation adjacent to open vials | $4.2 \times 10^{-5}$ |
| 4 | Closures hopper - airborne MCPs in UDAF workstation depositing onto closures in lidded hopper | $4.9 \times 10^{-7}$ |
| 5 | Filling cleanroom (EU GGMP grade B) - MCPs in cleanroom air transferred though workstation curtain | $2.2 \times 10^{-7}$ |
| 6 | Cleanroom garment - surface contact with products | $2.8 \times 10^{-8}$ |
| 7 | Filling workstation (EU GGMP grade A) filters - air drawn from filling cleanroom - 0.01% leak in filter directly above product | $3.8 \times 10^{-8}$ |
| 8 | Double gloves - surface contact with product | $1.3 \times 10^{-8}$ |
| 9 | Sterile tools - contact with product. e.g. forceps with container neck | $3.3 \times 10^{-9}$ |
| 10 | Filtered product solution | $2.0 \times 10^{-9}$ |
| 11 | Filling workstation (EU GGMP grade A) filters - air drawn from filling cleanroom, no leaks in filter | $2.2 \times 10^{-10}$ |
| 12 | Glove contact with liquid in pipework and tiling needles | $3.3 \times 10^{-12}$ |
| 13 | Floor in the non-UDAF filling room | $2.7 \times 10^{-13}$ |
| 14 | Floor in the UDAF filling workstation | $1.0 \times 10^{-13}$ |
| 15 | Filling workstation (EU GGMP grade A) filters - air supply from air conditioning plant, 100% leak in filter, directly above vials. | $6.7 \times 10^{-15}$ |

TABLE 2-continued

The importance of sources of airborne microbial contamination in a pharmaceutical cleanroom and clean zone.

| Risk Importance | Source of microbial contamination | NMD |
|---|---|---|
| 16 | Fillin workstation (EU GGMP grade A) filters - air drawn from air conditioning plant, 0.01% leak in filter, directly above vials | $6.7 \times 10^{-19}$ |
| 17 | Filling cleanroom (EU GGMP grade B) filters - air supply from air conditioning plant, 100% leak in filter | $2.9 \times 10^{-19}$ |
| 18 | Filling workstation (EU GGMP grade A) filters - air supply from air conditioning plant, no leek in filler | $4.0 \times 10^{-21}$ |
| 19 | Filling cleanroom (EU GGMP grade B) filters - air supply for air conditioning plant, no leak in filter | $4.0 \times 10^{-25}$ |
| 20 | Sterilized (depyrogenized) product containers | $1 \times 10^{-3000000}$ |

Cleanroom operator contamination may typically come from skin particulates removed by motion. Personnel may be considered to be the biggest threat and the highest source for contaminant material, accounting for about 75% to 80% of particles found in cleanroom inspections.

The techniques described herein can create a systematic method to better understand cleanroom practices and effective microorganism (EM) states. Using personal monitoring and frequent EM analysis may provide more instantaneous results. Manual methods for analyzing and monitoring cleanroom practices, including surface monitoring, may not provide results until hours or even days after the actions have been performed.

Figure 4:
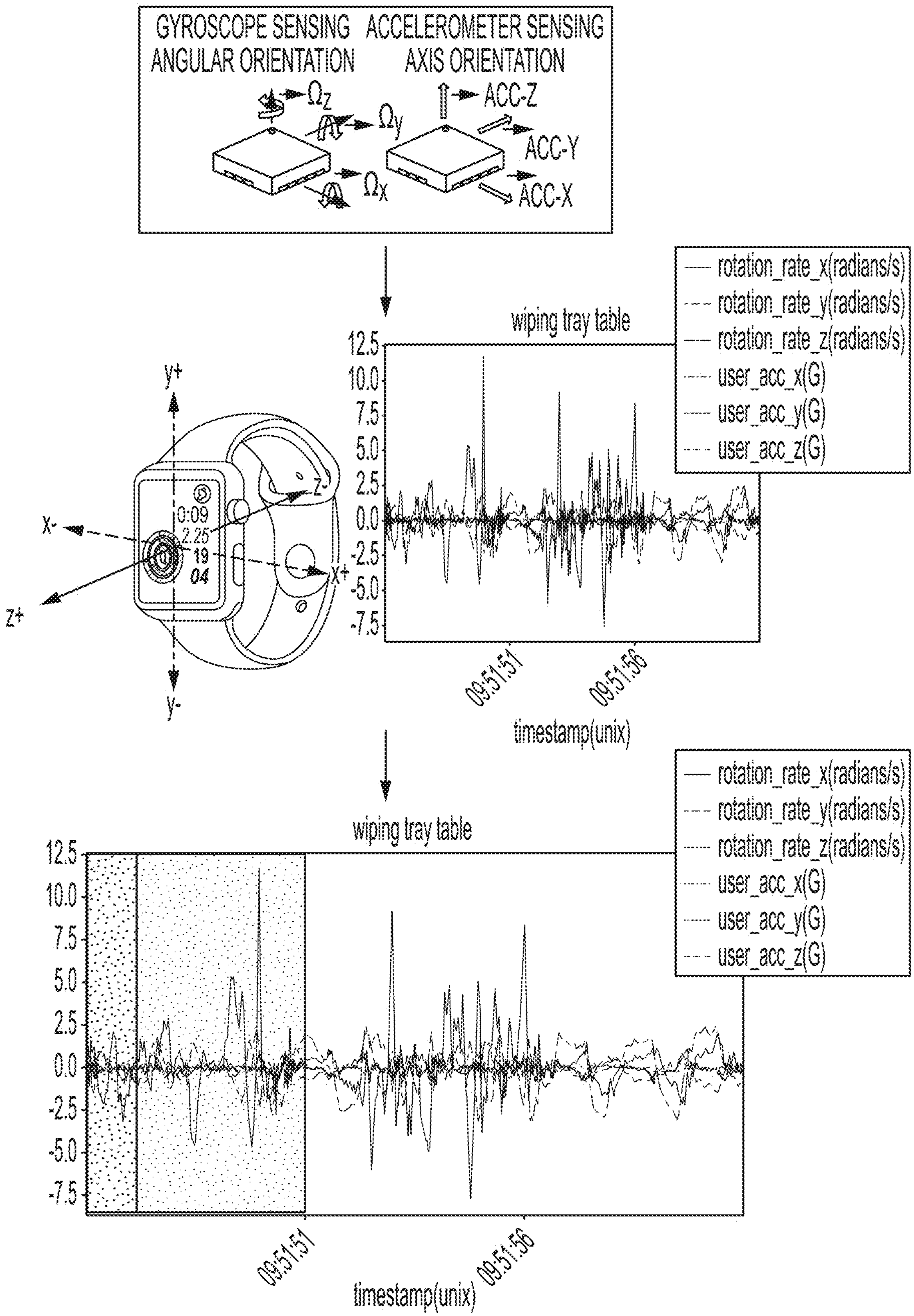
FIG. 4 is a conceptual diagram illustrating a wearable device that utilizes sensors to determine hand motion during a wiping action, in accordance with one or more techniques described herein.
Figure 5:
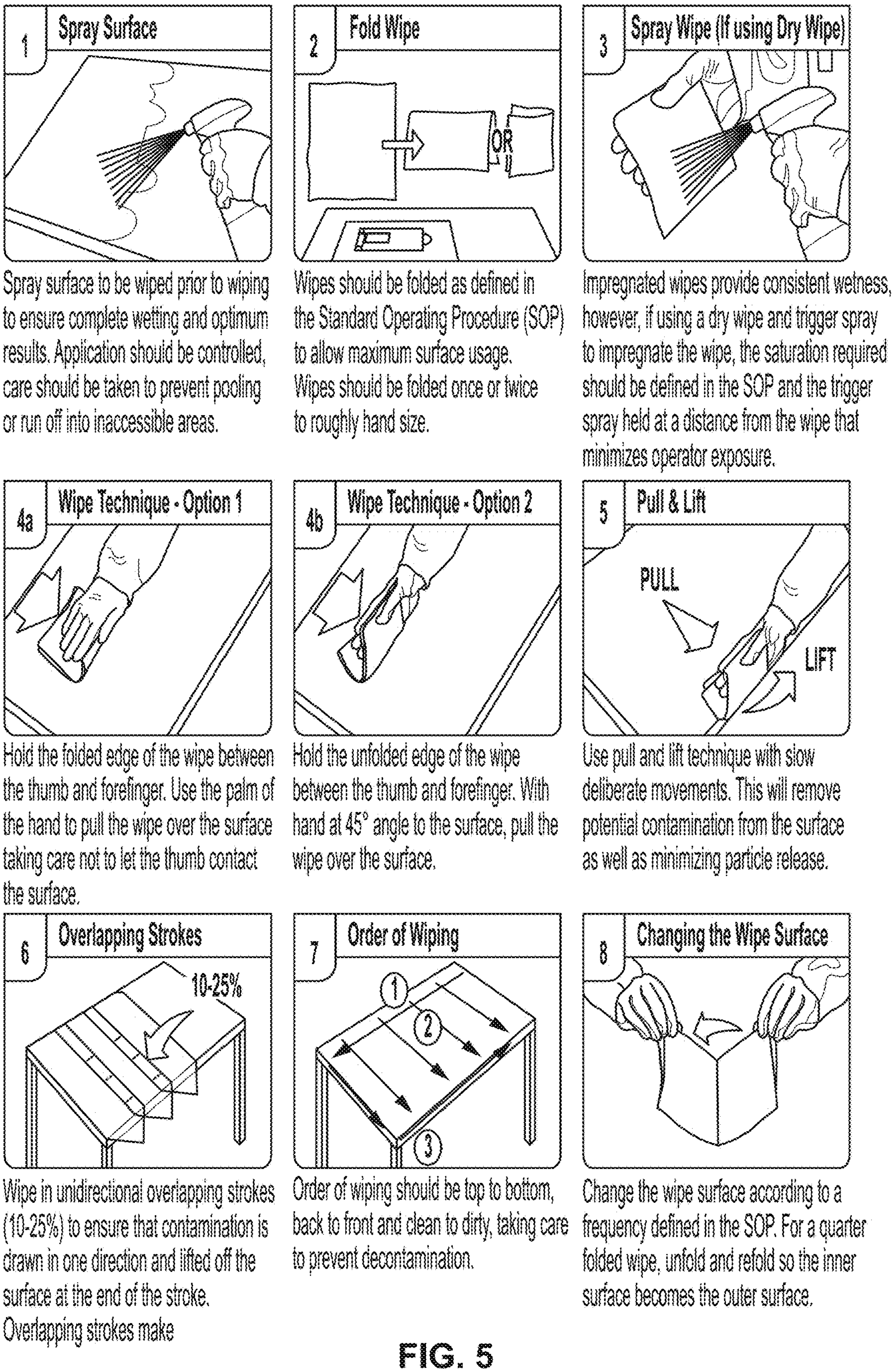
FIG. 5 is a chart illustrating proper wiping techniques, in accordance with one or more techniques described herein.

FIG. 4 is a conceptual diagram illustrating a wearable device that utilizes sensors to determine hand motion during a wiping action, in accordance with one or more techniques described herein. The raw data provided by such a device includes acceleration and angular velocity along three axes. The transform data includes the raw data built into time and frequency domains. The features are built and analyzed in sliding windows FIG. 5 is a chart illustrating proper wiping techniques, in accordance with one or more techniques described herein. Potential questions that the measured data could answer, when analyzed by efficacy module 222, include:

How long was the mop head used?

Were overlapping strokes used?

Did they lift away from the wall?

How many strokes were used for each wipe?

Were any pieces of equipment missed?

How long between sporicide application and rinse?

Figure 6:
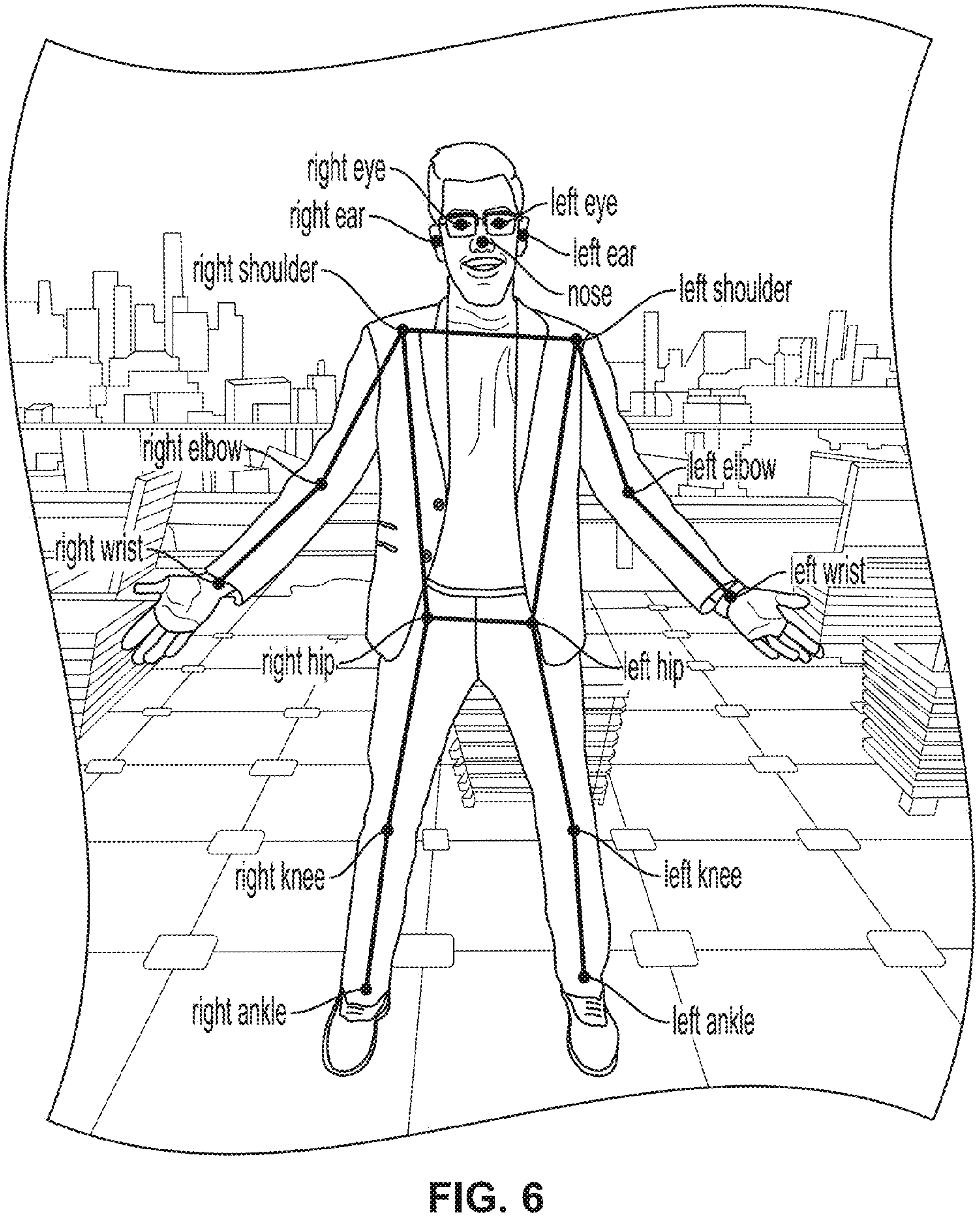
FIG. 6 is a conceptual diagram illustrating pose data points, in accordance with one or more techniques described herein.

FIG. 6 is a conceptual diagram illustrating pose data points, in accordance with one or more techniques described herein. Pose estimation is the task of using a machine learning (ML) model to estimate the pose of a person from an image or a video by estimating the spatial locations of key body joints (keypoints). A pretrained model works even on fully clothed individuals Streaming data is feasible towards near real-time tracking (but results into large datasets). The sensor's location let computing device 210 track much of the activity.

A challenge of prior systems is to see and track the hands movements (as skeleton recognition stops at wrist). Models used herein may be trained to identify machines and equipment, and to discern hand movements.

Figure 7:
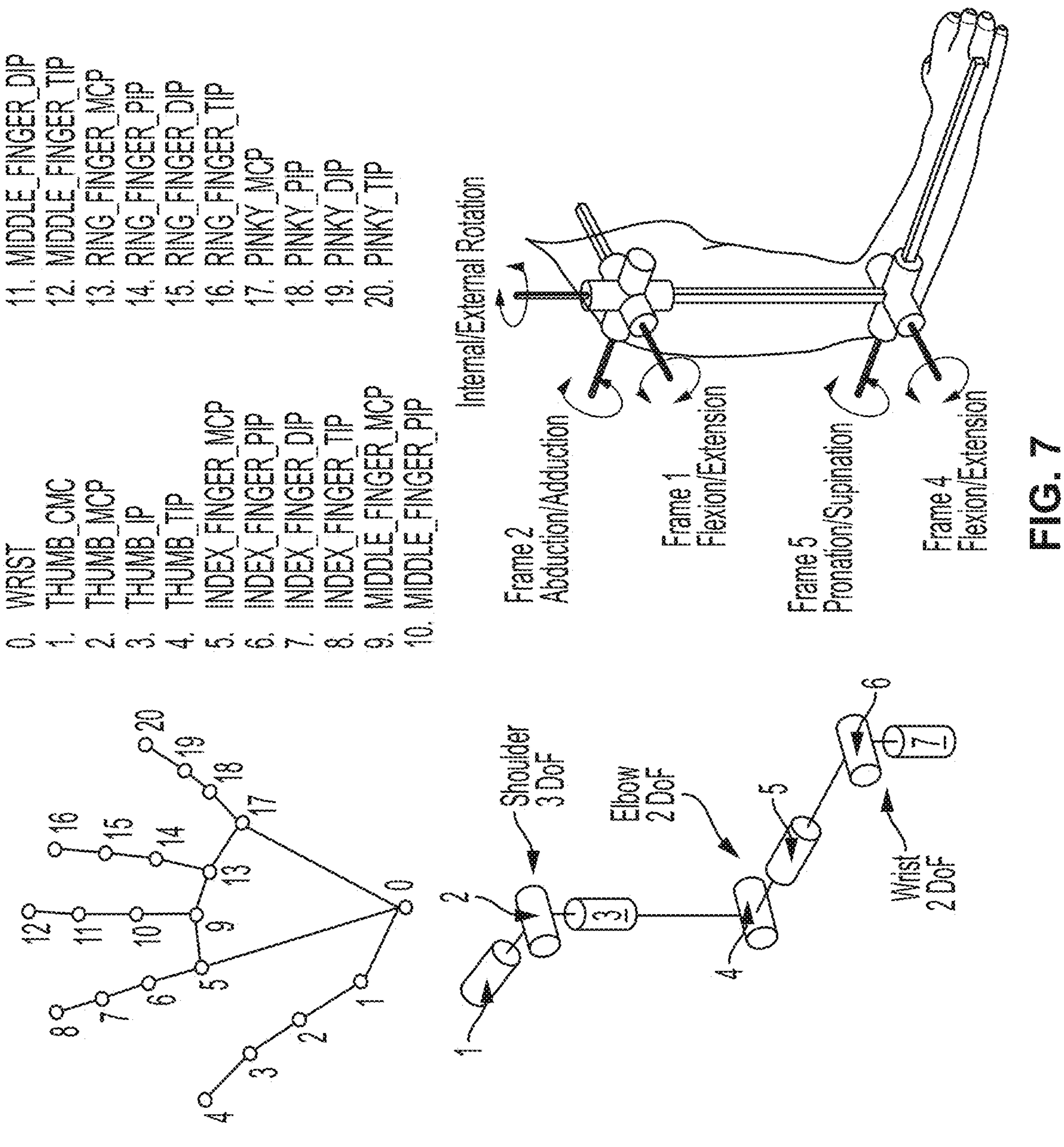
FIG. 7 is a conceptual diagram illustrating pose data points and motion data for hands, arms, and shoulders of individuals, in accordance with one or more techniques described herein.

FIG. 7 is a conceptual diagram illustrating pose data points and motion data for hands, arms, and shoulders of individuals, in accordance with one or more techniques described herein.

Figure 8:
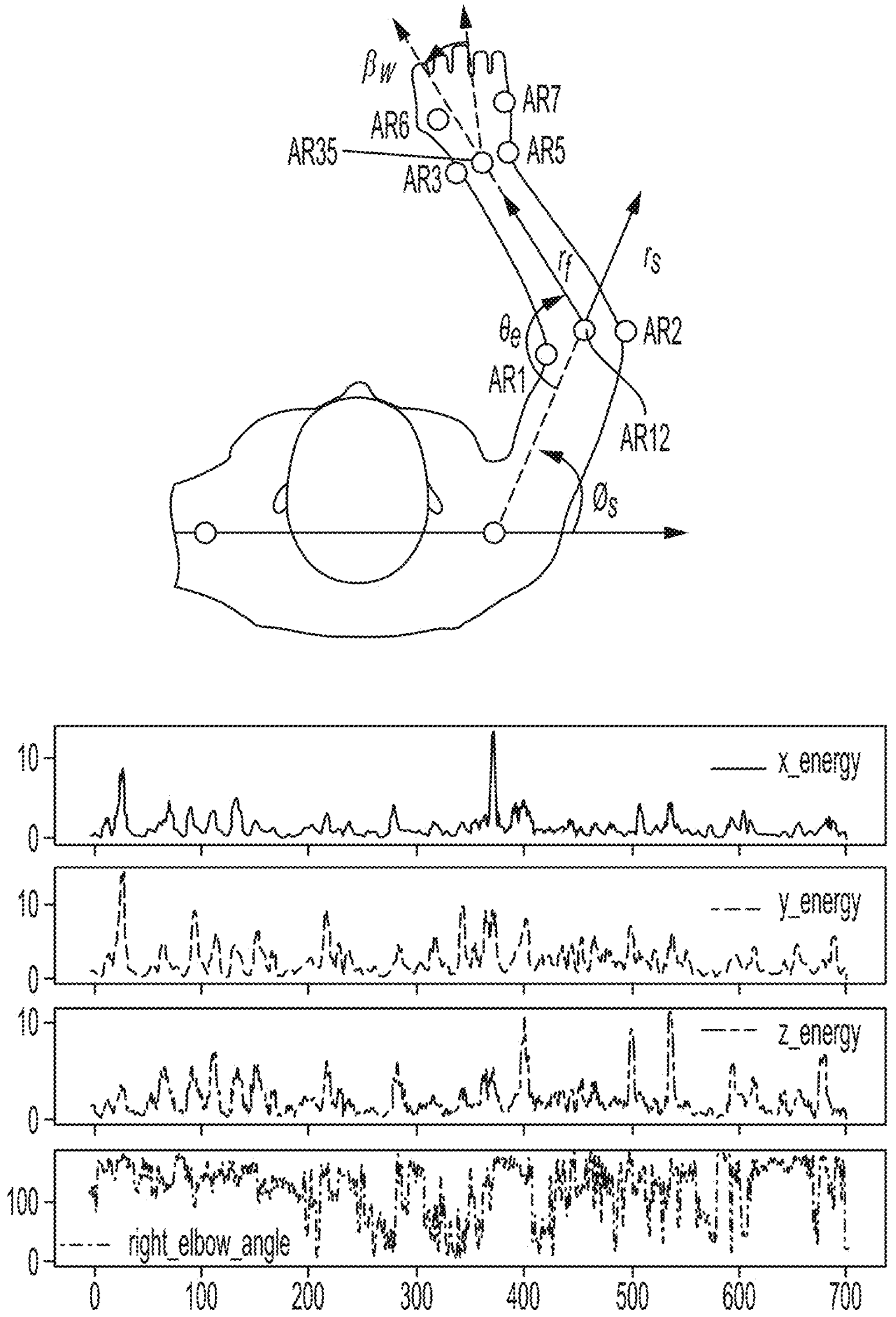
FIG. 8 is a conceptual diagram illustrating motion data for hands, arms, and shoulders of individuals, in accordance with one or more techniques described herein.

FIG. 8 is a conceptual diagram illustrating motion data for hands, arms, and shoulders of individuals, in accordance with one or more techniques described herein.

Figure 9:
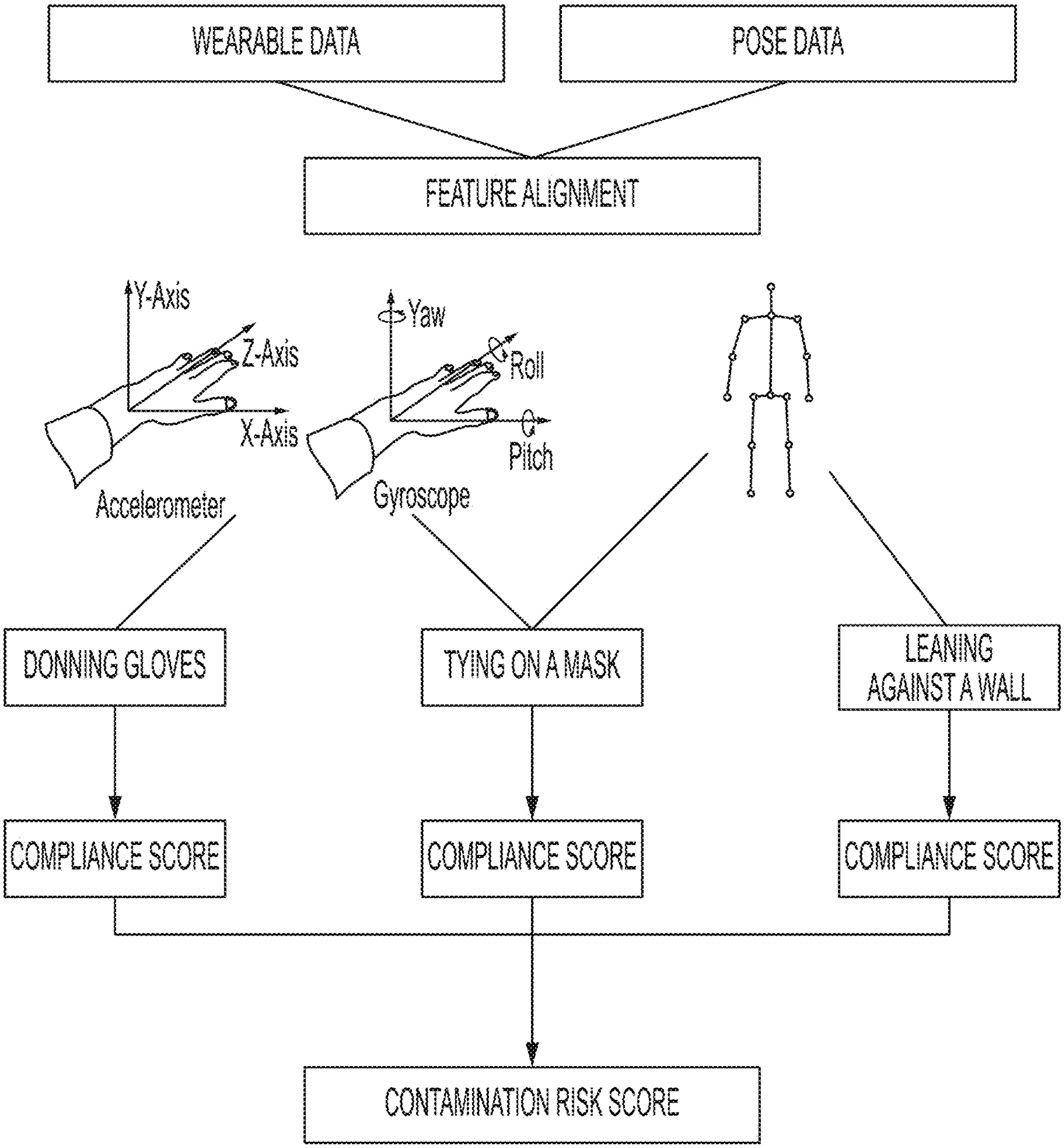
FIG. 9 is a flow diagram illustrating an example process for a system to utilize wearable data and/or pose data to determine a contamination risk score, in accordance with one or more techniques described herein.

FIG. 9 is a flow diagram illustrating an example process for a system to utilize wearable data and/or pose data to determine a contamination risk score, in accordance with one or more techniques described herein.

Figure 10:
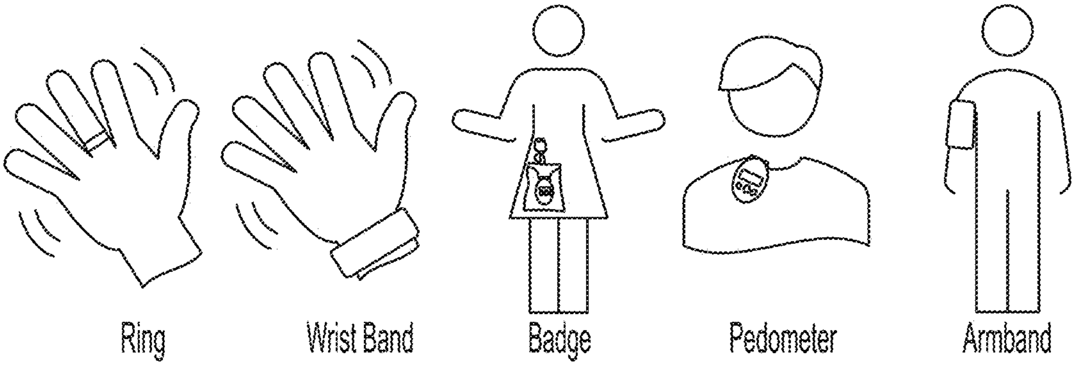
FIG. 10 is a conceptual diagram illustrating various example wearable devices, in accordance with one or more techniques described herein.

FIG. 10 is a conceptual diagram illustrating various example wearable devices, in accordance with one or more techniques described herein.

Figure 11:
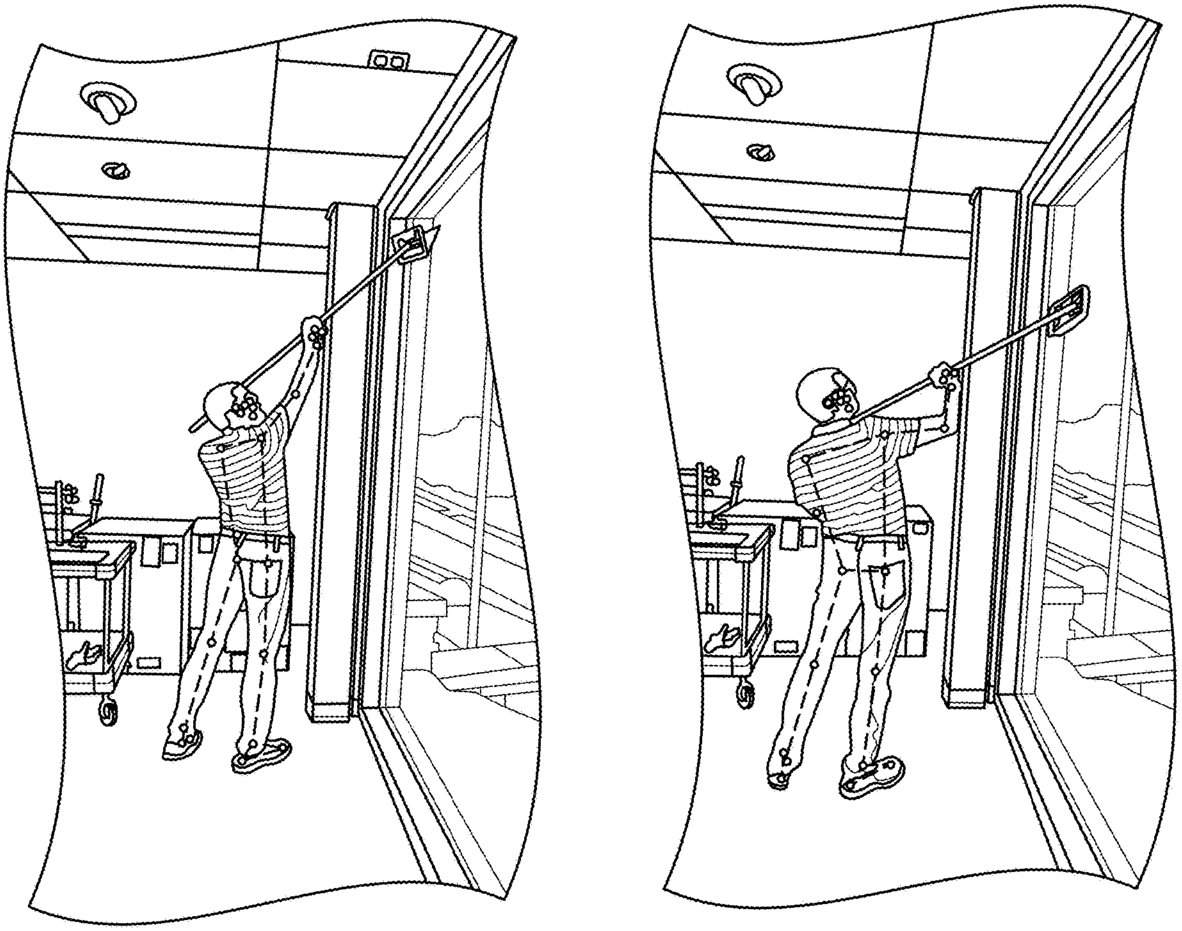
FIG. 11 is a conceptual diagram illustrating an example window cleaning operation with pose data, in accordance with one or more techniques described herein.

FIG. 11 is a conceptual diagram illustrating an example window cleaning operation with pose data, in accordance with one or more techniques described herein.

The following lists an example of the end-to-end system components. A wearable inertial measurement unit (IMU) may include a triaxial accelerometer, triaxial gyroscope, and triaxial magnetometer. The anatomical position of the IMU may be the subject's dominant hand wrist, but may also be present in other embodiments including: an IMU in an armband, an adhesive patch, or a sensor woven into a cleanroom garment. The IMU may have a user interface such as a screen, LED indicator, or vibrotactile feedback mechanism.

The system may further include a fixed-position video camera with unobstructed field of view of the subject, cleanroom tools, and equipment. The system may further include communication modalities for the IMU and video to offload raw time-series indexed data to a processing unit, for example a Bluetooth Low Energy (BLE) radio or WiFi radio. The system may further include a processing unit (e.g., computing device 210) located either onsite or on a remote server responsible for processing sensor data and arriving at a risk assessment for a cleaning session. Zones could also be defined by doors, for example, card swipe or passcode entry to go from a Clean Not Classified (CNC), gowning room, airlock or X grade cleanroom into a different grade cleanroom. Certain door interactions (e.g., passcode entry, keycard reading, etc.) may be used to identify crossing a spatial zone within a cleanroom.

The above list represent one example of the envisioned system. The system may also include multiples of the sensors described (i.e., IMUs at several anatomical locations of interest or multiple video cameras). The system may also include auxiliary sensors (beyond the core sensors) to facilitate operation, make the processing more efficient, or improve predictive accuracy of the predictive models. For example, radio frequency identification (RFID), near field communication (NFC), or Bluetooth Beacons can be used to define spatial "zones" in the cleanroom, thus turning a system observing for "prohibited activities" generally to one which can monitor for contextualized "prohibited activities in this zone".

Raw data are acquired from the wearable IMU and the video system independently and in parallel. These data are then transformed into features and aligned to form a common set of candidate features. From these features a first-pass predictive model is applied to discriminate course-grained activities and behaviors. A second-pass detection algorithm segments the predicted activity and attempts to determine if a prohibited activity has occurred and, where appropriate, to what degree. Finally, the aggregation of prohibited activities (and degrees) may be translated to a risk score based on a pre-built risk model.

In the IMU pipeline, the IMU produces acceleration and rotation raw data along three spatial axes at a fixed sampling rate. A data smoothing routine is applied to remove noise artifacts from the signal. Two sliding windows are applied to the raw data to generate candidate features in the time-, frequency-, and wavelet-domains via a fixed set of aggregation functions and transforms applied over the windows:

| IMU Feature Domain | Feature List |
|---|---|
| Time Domain | Mean, median, variance, standard deviation, minimum, maximum, sum, range, root-mean-squared, univariate signal magnitude area, zero crossings, mean absolute derivative of acceleration, standard deviation of derivative of acceleration, mean signal magnitude area of derivative of acceleration, signal magnitude area sum, signal vector magnitude mean, signal vector magnitude standard deviation |
| Frequency Domain | DC offset, peak frequency ($1^{st}$, $2^{nd}$, $3^{rd}$), peak amplitude ($1^{st}$, $2^{nd}$, $3^{rd}$ ), spectral energy features |
| Wavelet Domain | Wavelet persistence (low-, mid-, and high-bands) |

The window sizes upon which to apply the fast-Fourier transform (FFT) for frequency domain features and the discrete wavelet transform (DFT) for wavelet features are customizable hyperparameters of the pipeline. Cleanroom motions are typically very slow and methodical and, in order for these features to meaningfully discriminate between the activities of interest, the windows must be large enough to capture the back-and-forth cycle of the relevant motions.

In the video pipeline, the video system may produce image sequences at a known frame rate (which may not necessarily be the same sampling rate as the IMU). A computer vision routine detects human subjects via a bounding box to which a pose-estimation routine is applied. The video pipeline must remain robust in detecting human subjects in the fully-gowned state and permit periodic occlusion of part or all of the subject from the camera's frame of reference. The output of pose-estimation is a set of anatomical keypoints and confidence scores for each. Low-confidence scores for occluded or out-of-frame keypoints are filtered from the time-series of keypoints. Candidate features output by the video pipeline include aggregation functions applied to keypoint angles (e.g., elbow angles, shoulder angles) and pairwise Euclidean distances between keypoints. The following example illustrates the kinematics of the right elbow and right shoulder angles at two time points of a downward pass of a wall cleaning procedure:

The derivative of the elbow angle here becomes a feature encoding the flexion or extension of the limb. Features from the above pipelines are time-aligned to a common start and endpoint via the largest overlapping interval of both feature time series. Optionally, new multisensor candidate features are generated (e.g., correlation of IMU vector magnitude with dominant hand elbow angle) as well as holistic features of the distribution of a feature across a session (e.g., majority acute or majority obtuse right elbow angle to discriminate open arm tasks vs "close work")

Figure 12:
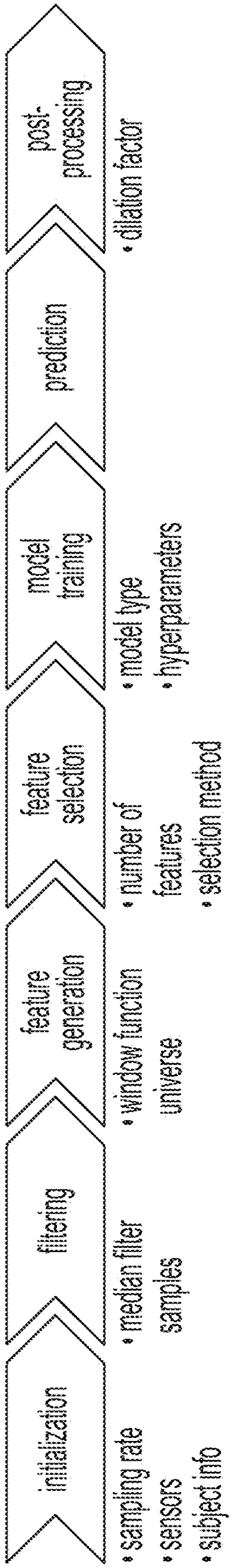
FIG. 12 is a conceptual diagram illustrating an example process for training a model to detect when an individual or group of individuals perform a prohibited action, in accordance with one or more techniques described herein.

FIG. 12 is a conceptual diagram illustrating an example process for training a model to detect when an individual or group of individuals perform a prohibited action, in accordance with one or more techniques described herein. A single supervised learning model is trained to discriminate high-level cleaning and operational activities. This portion of the end-to-end pipeline effectively labels portions of the session with a high-level category from the taxonomy:

Preparatory Activities
Gowning
Gloving
Hand Hygiene
Cleaning Activities
Wall Cleaning
Floor Cleaning
Equipment Cleaning
Operational Activities The stages of first-pass model training (along with the configurable parameters at each stage) are illustrated below. The model type can be, for example: logistic regression, naïve Bayesian network, neural network, k-nearest neighbor, support vector classifier, or random forest classifier.

The appropriateness of model choice depends on a number of factors. One factor is predictive performance (under some evaluation criteria such as F1-accuracy). A second factor may be compute complexity (e.g., if the model must run on a microprocessor or in a stronger compute environment). A third factor may include result latency (e.g., if the model must run at the edge in realtime or in the cloud or offline). A fourth factors may include explainability (e.g., if the model must produce an audit-able trace of its classification).

This model operates on a subset of the fused feature set that was determined (at training time) to be most predictive of high-level activity discrimination. Note that these may not be the same features from the same pipeline that are used in downstream processing. A high confidence classification sets up the appropriate algorithm to use in a second pass.

A second pass supervised learning model takes as input those portions of the session tagged in the first pass and applies an ensemble of models to identify prohibited activities or behaviors. Each model can select its own features and model type based on what combination discriminates the prohibited activity the best, including re-weighting the features arising from the IMU and video pipelines. Where appropriate, interpolation and filtering out impossible sequences is performed before classification. The ensemble-of-models approach permits the detection of multiple prohibited behaviors in the same time span whose co-occurrence may yield additive risk for cleanroom contamination.

A multitude of possible downstream actions may result from a computed risk threshold that is above a configurable threshold. These areas may include real-time alerting (e.g., sending vibrotactile feedback to the user, and SMS or email to a manager when the prohibited activity occurs), recommended re-cleaning (e.g., identifying that an area must be re-cleaned because of poor technique or prohibited activity occurring therein), offline reporting and trending (e.g., a trend of compliance for each user, site, area), training and re-training opportunities (e.g., a report of sustained prohibited behavior detection across users or across time), root-cause analysis or an auditable trace of activities (e.g., the inclusion of prohibited activities in a larger incident report), and a breadcrumb/heatmap of where violations happened (e.g., a heatmap of violation frequency overlaid with the cleanroom floorplan).

Some illustrative examples of how some characteristic prohibited activities and behaviors might be detected by the proposed system may fall into the categories of: (1) inertial constraints on activity/behavior, (2) prohibited postures, (3) missing risk-reducing sub-actions in cyclical activities, and (4) sequence errors in order of operations.

For inertial constraints on activity/behavior, undertaking any activity in the cleanroom too quickly introduces the risk of creating turbulent flow and shedding particles at an increased rate. As such, a characteristic example of a prohibited behavior would be the detection of motions that occur too quickly relative to some established threshold. The accelerometer sensor in the IMU is already an objective gold-standard with respect to the measurement of accelerations. Furthermore, when positioned at the wrist, it is a reasonable surrogate for the overall motion of the trunk and limb to which it is attached as well as the motion of other limbs with correlated kinematics and frequency of cycles (e.g., arm-leg speed and stride cycle correlations).

For prohibited postures, another characteristic prohibited behavior is bending over. This behavior could be detected primarily by the postural pipeline by detecting a sustained acute angle between the head-hip-knee keypoints.

Figure 13:
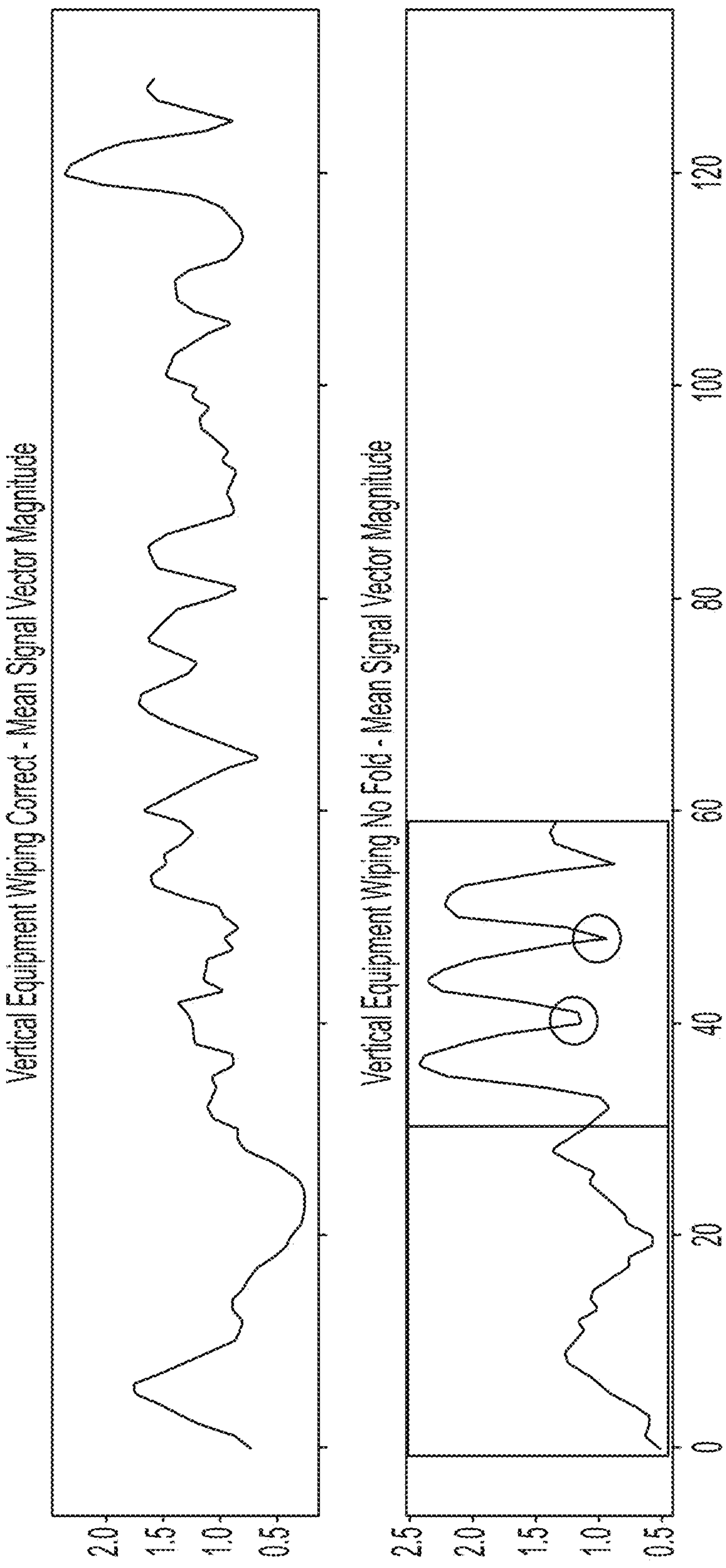
FIG. 13 is a series of graphs illustrating proper vertical equipment wiping motions and improper vertical equipment wiping motions, in accordance with one or more techniques described herein.

FIG. 13 is a series of graphs illustrating proper vertical equipment wiping motions and improper vertical equipment wiping motions, in accordance with one or more techniques described herein. For missing risk-reducing sub-actions in cyclical activities, many cleaning motions in particular involve a cyclical back-and-forth motion (wiping, dusting, mopping). There are at least two examples where it is prohibited to perform such activities in a continuous cycle without the introduction of another shorter activity. One example includes performing multiple strokes of a wipe during equipment cleaning without folding the wipe in such a way to expose a clean surface. A second example includes cleaning a wall with a mop in a snake-like (top-to-bottom-to-top) motion rather than releasing the mophead from the wall after each pass (top-to-bottom-release repeat).

To illustrate the progression through the data pipeline for the first of these examples, the following is an example of the IMU signature for a correct and incorrect (no fold) vertical equipment cleaning activities. There may be three different features discriminate the prohibited vertical wiping without folding behavior: The overall activity duration is shorter, the time-series has sharp valleys, indicative of a reverse snake motion rather than a release and fold, and the dominant frequency would have a sharp peak around 0.1 Hz as the cyclical snake motion would make this more peaked/pronounced.

For the purposes of this disclosure, certain examples of cleaning actions (each of which may have several sub-actions) include a record of gowning, surface wiping, equipment wiping, material transfer disinfection, hand hygiene, wall mopping, and HEPA vacuuming. Motion-specific sub-actions, such as for surface wiping, could include fold paper to quarter fold, spray dry wipe evenly or use wetted wipe (define # of sprays to saturate), wipe unidirectionally with 10-25% overlapping strokes, do not reuse a surface more than 2×, and each wipe can only be used 8× before using a new one.

For the purposes of this disclosure, certain examples of forbidden actions include (excluding simple inverses, e.g., compliant wiping vs. non-compliant wiping) rapid movements creating turbulence greater than a threshold speed (e.g., between 3 and 5 miles per hour, such as 3.57 mph), touching face with a glove, scratching body with glove, bending over (except during initial gowning), leaning against a wall, placing arms on countertop, except when necessary, zone crossing in wrong order or without hand-washing/gowning, material transfer without proper sanitation, cart transfer into wrong areas, violate proximity and occupancy limits, entry without access permission, and insufficient airlock settling time between door openings.

For the purposes of this disclosure, certain examples of gowning forbidden practices allowing skin or hair to protrude, letting things touch the floor, forgetting to clean hands between steps, putting things on in the wrong order, touching outside surfaces, talking while you are gowning, or not using the right size or fit. It should be noted that several of these criteria can be corrected with IPA application, so an instant "fail" would not always be useful, but an alert may be.

For the purposes of this disclosure, certain examples of compliant, non-cleaning actions and SOP steps include a QMS compliance step, a QMS reporting requirement-batch record, record of gowning movement speed less than a threshold speed (e.g., between 3 and 5 miles per hour, such as 3.57 mph), maintain proximity and occupancy limits, restricted entry control, EM sampling, HMI interface, equipment maintenance, equipment operation, shared work criteria, a correct order of operation, a correct room occupancy, surface cleaning coverage sufficient to quality specification, and correct location.

Example situations where monitored action is scored may include whether cleaning operation has been performed, and evaluated to a quality threshold, whether set of general behaviors has been maintained to a quality threshold while doing a specific action, whether output is desired for each user, whether output is desired for all users to evaluated combined effort, and whether data must always be saved, traceable, trackable to individual users, and maintain data integrity to maintain company's 21 CFR 11 compliance.

Example situations where combined output differs from sum of individual output could include:

1) Floor cleaning followed by wall cleaning (time/location tracking needed to validate correct order of operation).
2) 2 users wiping the same surface; do they cover all surfaces sufficiently? (accurate assessment of surface cleaning needed).
3) 1 cleaner wipes a surface, then it is contaminated by another within certain time (time/location tracking needed to validate correct order of operation).
4) Improved efficiency: notify 2nd operator that a surface has already been completed, move on to next step/object. (checklisting or location/activity monitoring)

In one instance, an example action may include noncompliant wiping. The system may detect key actions as a universal wiping technique (e.g., fold paper to quarter fold, spray dry wipe evenly or use wetted wipe, use IPA or sporicidal as appropriate, wipe unidirectionally with 10-25% overlapping strokes, ensure complete coverage, do not reuse a surface more than 2×, and each wipe can only be used 8× before using a new one). An example entry could include wipe down the outer bag with 70% IPA to remove any dust or debris. (5.5.6-GLSPR005: transfer disinfection).

Note that not every step may be trackable, or trackable with a single technology. For example, spraying is likely not trackable with a wristwatch, but may be with partnered technology, and may not be needed to sufficiently judge compliance.

The below example shows a multi-user action where the combination fails, but individual actions are compliant.

User 1 may perform wall cleaning, where the system determines whether cleaning operation has been performed to a threshold of quality and determines whether the user has maintained general behavior compliance. The individual output may include that the system determines the individual is SOP step compliant.

User 2 may perform floor cleaning, where the system determines whether cleaning operation has been performed to a threshold of quality and determines whether user has maintained general behavior compliance. The individual output may include that the system determines the individual is SOP step compliant.

However, the system may detect that the floor was cleaned before walls. This may be a failure, and the system may output an alert indicating that corrective actions must be performed, such as repeating sanitation.

Figure 14:
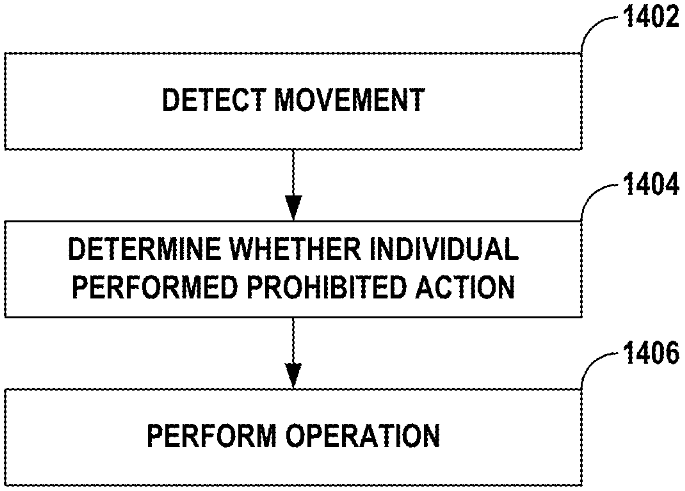
FIG. 14 is a flow diagram illustrating an example operation of a system configured to detect whether an individual performed a prohibited action during a cleaning event, in accordance with one or more techniques described herein.

FIG. 14 is a flow diagram illustrating an example operation of a system configured to detect whether an individual performed a prohibited action during a cleaning event, in accordance with one or more techniques described herein. The techniques of FIG. 5 may be performed by one or more processors of a computing device, such as system 100 of FIG. 1 and/or computing device 210 illustrated in FIG. 2. For purposes of illustration only, the techniques of FIG. 5 are described within the context of computing device 210 of FIG. 2, although computing devices having configurations different than that of computing device 210 may perform the techniques of FIG. 5.

In accordance with the techniques of this disclosure, a wearable computing device that is worn by an individual performing cleaning in an environment may detect movement associated with the wearable device during a cleaning event (1402). Efficacy determination module 222 may determine, based on the movement associated with the wearable computing device detected during the cleaning event, whether the individual has performed a prohibited action during the cleaning event (1404). Responsive to determining that the individual performed the prohibited action during the cleaning event, I/O module 220 may perform an operation (1406).

Figure 15:
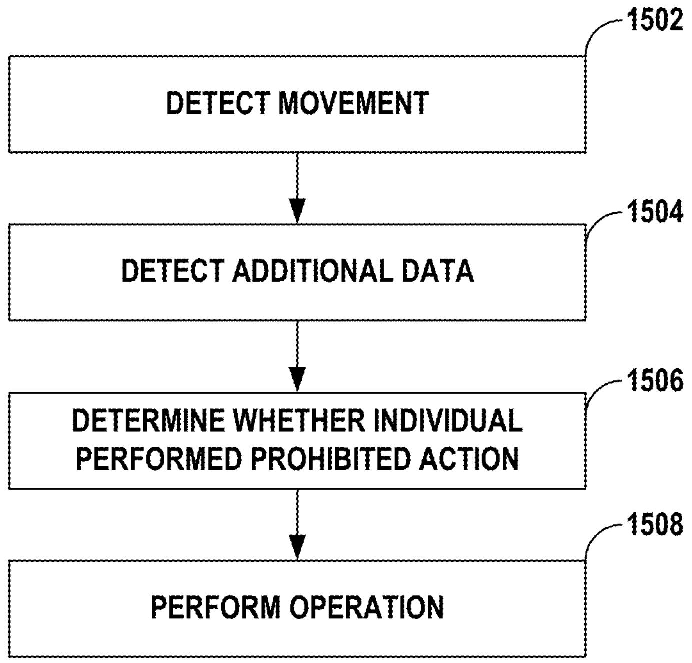
FIG. 15 is a flow diagram illustrating another example operation of a system configured to detect whether an individual performed a prohibited action during a cleaning event, in accordance with one or more techniques described herein.

FIG. 15 is a flow diagram illustrating another example operation of a system configured to detect whether an individual performed a prohibited action during a cleaning event, in accordance with one or more techniques described herein. The techniques of FIG. 5 may be performed by one or more processors of a computing device, such as system 100 of FIG. 1 and/or computing device 210 illustrated in FIG. 2. For purposes of illustration only, the techniques of FIG. 5 are described within the context of computing device 210 of FIG. 2, although computing devices having configurations different than that of computing device 210 may perform the techniques of FIG. 5.

In accordance with the techniques of this disclosure, a wearable computing device that is worn by an individual performing cleaning in an environment may detect movement associated with the wearable device during a cleaning event (1502). A camera system external to the wearable computing device may detect additional data for the individual during the cleaning event (1504). Efficacy determination module 222 may determine, based on the movement associated with the wearable computing device and the additional data detected by the camera system, whether the individual has performed a prohibited action during the cleaning event (1506). Responsive to determining that the individual performed the prohibited action during the cleaning event, I/O module 220 may perform an operation (1508).

Figure 16:
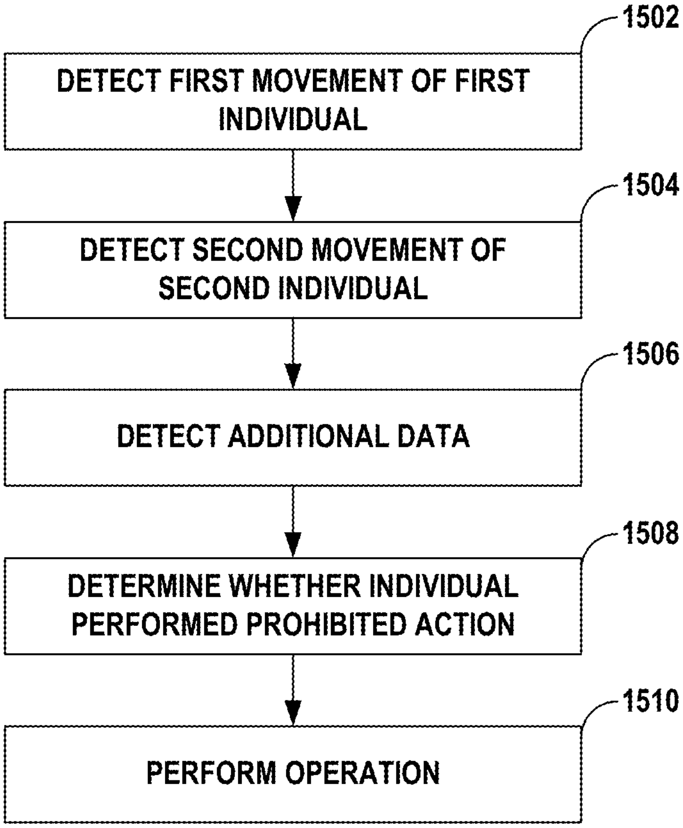
FIG. 16 is a flow diagram illustrating an example operation of a system configured to detect whether an individual or group of individuals performed a prohibited action during a cleaning event, in accordance with one or more techniques described herein.

FIG. 16 is a flow diagram illustrating an example operation of a system configured to detect whether an individual or group of individuals performed a prohibited action during a cleaning event, in accordance with one or more techniques described herein. The techniques of FIG. 5 may be performed by one or more processors of a computing device, such as system 100 of FIG. 1 and/or computing device 210 illustrated in FIG. 2. For purposes of illustration only, the techniques of FIG. 5 are described within the context of computing device 210 of FIG. 2, although computing devices having configurations different than that of computing device 210 may perform the techniques of FIG. 5.

In accordance with the techniques of this disclosure, a first wearable computing device that is worn by a first individual performing cleaning in an environment may detect first movement associated with the first wearable device during a cleaning event (1602). A second wearable computing device that is worn by a second individual performing cleaning in the environment may detect second movement associated with the second wearable device during the cleaning event (1604). A camera system external to the wearable computing device may detect pose data for each of the first individual and the second individual during the cleaning event (1606). Efficacy determination module 222 may determine, based on the first movement associated with the first wearable computing device, the second movement associated with the second wearable computing device, and the additional data detected by the camera system, whether one or more of the first individual or the second individual performed a prohibited action (1608). Responsive to determining that one or more of the first individual or the second individual performed the prohibited action, I/O module 220 may perform an operation (1610).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A method comprising:

detecting, by a wearable computing device that is worn by an individual performing cleaning in an environment, movement associated with the wearable device during a cleaning event, wherein the environment comprises a cleanroom segmented into a plurality of areas, each area having a respective assigned cleaning protocol level, wherein detecting the movement associated with the wearable computing device comprises measuring, by at least one sensor of the wearable computing device, movement data;

detecting, by one or more sensors external to the wearable computing device, additional data indicative of one or more states of the individual during the cleaning event, wherein the one or more sensors external to the wearable computing device comprise at least one of a door entry logging system and a door exit logging system configured to identify zone transitions by the individual between the plurality of areas;

determining, by one or more processors, based on the movement associated with the wearable computing device detected during the cleaning event and the additional data detected by the one or more sensors, whether the individual has performed a prohibited action during the cleaning event, wherein determining whether the individual has performed the prohibited action during the cleaning event comprises:

determining at least one signal feature for the movement data, and comparing the at least one signal feature for the movement data to reference signal feature data associated with the prohibited action, wherein the prohibited action comprises traversing the plurality of areas in an order that violates a predefined zone-transition protocol based on one or more of door entry logging data and door exit logging data; and responsive to determining that the individual performed the prohibited action during the cleaning event, performing, by the one or more processors, an operation comprising issuing a user alert to a computing device separate from the wearable computing device indicating the prohibited action.

2. The method of claim 1, wherein performing the operation comprises issuing one of an audible, a tactile, and a visual alert via the wearable computing device.

3. The method of claim 1, wherein the environment comprises one or more of a cleanroom and one or more ancillary controlled spaces.

4. The method of claim 1, further comprising receiving, by the wearable computing device, an indication that the individual performing cleaning has deviated from a planned cleaning protocol during the cleaning event.

5. The method of claim 1, further comprising:

determining, by the one or more processors and based on the movement associated with the wearable computing device detected during the cleaning event, a risk score for the cleaning event; and responsive to the risk score exceeding the threshold risk score, outputting, by the one or more processors, a fail indication for the cleaning event.

6. The method of claim 5, wherein determining the risk score comprises:

determining, by the one or more processors, whether the individual performed one or more non-compliant cleaning movements; and responsive to determining that the individual performed the one or more non-compliant cleaning movements, increasing, by the one or more processors, the risk score based on a weighted model and the one or more non-compliant cleaning movements.

7. The method of claim 6, wherein the one or more non-compliant cleaning movements comprises one or more of:

an improper record of gowning, a non-compliant surface wiping motion, a non-compliant equipment wiping motion,
a failure to disinfect during a material transfer,
improper hand hygiene,
improper wall mopping,
improper HEPA vacuuming,
an improper paper fold,
improper floor mopping, and
an improper cleaning spray distribution.

8. The method of claim 1 wherein the prohibited action comprises one or more of:
the individual improperly interacting with their body,
the individual improperly contacting a surface in the environment,
the individual placing themselves in an improper state, and
the individual improperly moving throughout the environment.

9. The method of claim 1, wherein the wearable computing device includes the one or more processors.

10. The method of claim 1, further comprising:
transmitting, by the wearable computing device, movement data to an external computing device in wireless communication with the wearable computing device, wherein the external computing device includes the one or more processors.

11. The method of claim 1, further comprising:
determining, by the one or more processors, using a model, and based on the movement associated with the wearable computing device and the additional data detected by the one or more sensors, a multi-stream risk score for the individual during the cleaning event.

12. The method of claim 11, wherein the model comprises a plurality of weights, each weight corresponding to a potential action detected by one of the wearable computing device or one of the one or more sensors external to the wearable computing device.

13. The method of claim 1, wherein the one or more sensors comprise one or more of:
a camera system,
a pressure sensor system,
an audio sensor system,
a radio detection and ranging system,
a light detection and ranging system,
a proximity sensor system,
a door entry logging system,
a door exit logging system, and
a thermal imaging system.

14. The method of claim 13, wherein the one or more sensors comprise the camera system, and wherein the additional data comprises one or more of:
pose data for the individual during the cleaning event,
image data for the individual during the cleaning event, and
video data for the individual during the cleaning event.

15. The method of claim 1, wherein the additional data is indicative of one or more of:
that hair of the individual is exposed,
that skin of the individual is exposed,
that a position of the individual is improper during the cleaning event,
that a form of the individual is improper during the cleaning event,
that the individual has touched outside surfaces while gowned,
that the individual gowned in an improper order,
that a gown worn by the individual is not a correct size,
that the gown worn by the individual has an incorrect fit,
movement speed,
proximity information,
occupancy information, and
self-sanitation compliance.

16. The method of claim 1, wherein the prohibited action comprises one or more of:
a movement speed exceeding a threshold movement speed,
the individual touching a face while wearing a glove,
the individual scratching a body while wearing the glove,
the individual bending over,
the individual leaning against a wall,
the individual placing one or more arms on a countertop,
the individual crossing one or more zones in a wrong order,
a material transfer without proper sanitation,
a cart transfer into a wrong area,
a violation of proximity limits,
a violation of occupancy limits,
entering a space without access permission, and
insufficient airlock settling time between instances of a door opening.

17. The method of claim 1, further comprising:
synchronizing, by the one or more processors, a clock on the wearable device and a clock on the one or more sensors; and
interleaving, by the one or more processors, the movement associated with the wearable computing device and the additional data detected by the one or more sensors based on timestamps associated with the movement and timestamps associated with the additional data.

18. A method comprising:
detecting, by a wearable computing device that is worn by an individual performing cleaning in an environment, movement associated with the wearable device during a cleaning event, wherein the environment comprises a cleanroom segmented into a plurality of areas, each area having a respective assigned cleaning protocol level, wherein detecting the movement associated with the wearable computing device comprises measuring, by at least one sensor of the wearable computing device, movement data;
detecting, by a camera system external to the wearable computing device, additional data for the individual during the cleaning event, the additional data comprising pose data for the individual during the cleaning event, wherein the camera system external to the wearable computing device comprise at least one of a door entry logging system and a door exit logging system configured to identify zone transitions by the individual between the plurality of areas;
determining, by the one or more processors, based on the movement associated with the wearable computing device and the additional data detected by the camera system, whether the individual has performed a prohibited action during the cleaning event, wherein determining whether the individual has performed the prohibited action during the cleaning event comprises:
determining at least one signal feature for the movement data, and
comparing the at least one signal feature for the movement data to reference signal feature data associated with the prohibited action, wherein the prohibited action comprises traversing the plurality of areas in an order that violates a predefined zone-transition protocol based on one or more of door entry logging data and door exit logging data; and responsive to determining that the individual performed the prohibited action during the cleaning event, performing, by the one or more processors, an operation comprising issuing a user alert to a computing device separate from the wearable computing device indicating the prohibited action.

19. The method of claim 18, further comprising:

determining, by the one or more processors, using a model, and based on the movement associated with the wearable computing device and the additional data detected by the camera system, a multi-stream risk score for the individual during the cleaning event.

20. The method of claim 19, wherein the model comprises a plurality of weights, each weight corresponding to a potential action detected by one of the wearable computing device or the camera system.

21. The method of claim 18, wherein the additional data further comprises one or more of:

image data for the individual during the cleaning event, and video data for the individual during the cleaning event.

22. The method of claim 18, wherein the additional data is indicative of one or more of:

that hair of the individual is exposed, that skin of the individual is exposed, that a position of the individual is improper during the cleaning event, that a form of the individual is improper during the cleaning event, that the individual has touched outside surfaces while gowned, that the individual gowned in an improper order, that a gown worn by the individual is not a correct size, that the gown worn by the individual has an incorrect fit, movement speed, proximity information, occupancy information, and self-sanitation compliance.

23. The method of claim 18, wherein the prohibited action comprises one or more of:

a movement speed exceeding a threshold movement speed, the individual touching a face while wearing a glove, the individual scratching a body while wearing the glove, the individual bending over, the individual leaning against a wall, the individual placing one or more arms on a countertop, the individual crossing one or more zones in a wrong order, a material transfer without proper sanitation, a cart transfer into a wrong area, a violation of proximity limits, a violation of occupancy limits, entering a space without access permission, and insufficient airlock settling time between instances of a door opening.

24. The method of claim 18, further comprising:

synchronizing, by the one or more processors, a clock on the wearable device and a clock on the camera system; and interleaving, by the one or more processors, the movement associated with the wearable computing device and the additional data detected by the camera system based on timestamps associated with the movement and timestamps associated with the additional data.

25. The method of claim 18, wherein:

detecting the movement associated with the wearable computing device comprises measuring, by at least one sensor of the wearable computing device, movement data, and wherein determining whether the individual has performed the prohibited action during the cleaning event comprises:

determining at least one signal feature for the movement data, and comparing the at least one signal feature for the movement data to reference signal feature data associated with the prohibited action.

26. The method of claim 18, wherein performing the operation comprises issuing one of an audible, a tactile, and a visual alert via the wearable computing device.

27. The method of claim 18, wherein performing the operation comprises issuing a user alert to a computing device separate from the wearable computing device indicating the prohibited action.

28. The method of claim 18, wherein the environment comprises a cleanroom.

29. The method of claim 18, further comprising receiving, by the wearable computing device, an indication from the individual performing cleaning that there has been a deviation from a planned cleaning protocol during the cleaning event.

30. The method of claim 18, further comprising:

determining, by the one or more processors and based on the movement associated with the wearable computing device detected during the cleaning event, a risk score for the cleaning event; and responsive to the risk score exceeding the threshold risk score, outputting, by the one or more processors, a fail indication for the cleaning event.

31. The method of claim 30, wherein determining the risk score comprises:

determining, by the one or more processors, whether the individual performed one or more non-compliant cleaning movements; and responsive to determining that the individual performed the one or more non-compliant cleaning movements, increasing, by the one or more processors, the risk score based on a weighted model and the one or more non-compliant cleaning movements.

32. The method of claim 31, wherein the one or more non-compliant cleaning movements comprises one or more of:

an improper record of gowning, a non-compliant surface wiping motion, a non-compliant equipment wiping motion, a failure to disinfect during a material transfer, improper hand hygiene, improper wall mopping, improper HEPA vacuuming, an improper paper fold, and an improper cleaning spray distribution.

33. The method of claim 18, wherein the prohibited action comprises one or more of:

the individual improperly interacting with their body, the individual improperly contacting a surface in the environment, the individual placing themselves in an improper state, and the individual improperly moving throughout the environment.

34. The method of claim 18, wherein the wearable computing device includes the one or more processors.

35. The method of claim 18, further comprising:

transmitting, by the wearable computing device, movement data to an external computing device in wireless communication with the wearable computing device, wherein the external computing device includes the one or more processors; and transmitting, by the camera system, the additional data to the external computing device in wireless communication with the camera system.

36. The method of claim 18, wherein the camera system includes the one or more processors.

37. A method comprising:

detecting, by a first wearable computing device that is worn by a first individual performing cleaning in an environment, first movement associated with the first wearable device during a cleaning event, wherein the environment comprises a cleanroom segmented into a plurality of areas, each area having a respective assigned cleaning protocol level, wherein detecting the movement associated with the wearable computing device comprises measuring, by at least one sensor of the wearable computing device, movement data;

detecting, by a second wearable computing device that is worn by a second individual performing cleaning in the environment, second movement associated with the second wearable device during the cleaning event, wherein the first and second wearable computing device are configured to identify zone transitions by the respective individual between the plurality of areas;

detecting, by a camera system external to the wearable computing device, additional data for each of the first individual and the second individual during the cleaning event, the additional data comprising pose data for the first individual and the second individual during the cleaning event;

determining, by the one or more processors, based on the first movement associated with the first wearable computing device, the second movement associated with the second wearable computing device, and the additional data detected by the camera system, whether one or more of the first individual or the second individual performed a prohibited action, wherein determining whether the individual has performed the prohibited action during the cleaning event comprises:

determining at least one signal feature for the movement data, and comparing the at least one signal feature for the movement data to reference signal feature data associated with the prohibited action, wherein the prohibited action comprises traversing the plurality of areas in an order that violates a predefined zone-transition protocol based on one or more of door entry logging data and door exit logging data; and responsive to determining that one or more of the first individual and the second individual performed the prohibited action, performing, by the one or more processors, an operation comprising issuing a user alert to a computing device separate from the wearable computing device indicating the prohibited action.

38. The method of claim 37, wherein the environment comprises a cleanroom, and wherein the cleanroom is segmented into a plurality of areas including a first area and a second area, wherein the first area is classified under a first cleaning protocol, wherein the second area is classified under a second cleaning protocol different than the first protocol, and wherein determining whether the prohibited action was performed is based on an area of the plurality of areas where an individual is located and a protocol associated with that respective area.

* * * * *